US009053525B2

(12) United States Patent
Kim et al.

(10) Patent No.: US 9,053,525 B2
(45) Date of Patent: Jun. 9, 2015

(54) ENTROPY CODING METHOD USING AN INDEX MAPPING TABLE, AND IMAGE-ENCODING/DECODING APPARATUS AND METHOD USING SAID ENTROPY CODING METHOD

(75) Inventors: Jong Ho Kim, Daejeon-si (KR); Hui Yong Kim, Daejeon-si (KR); Sung Chang Lim, Daejeon (KR); Ha Hyun Lee, Seoul (KR); Jin Ho Lee, Daejeon-si (KR); Se Yoon Jeong, Daejeon-si (KR); Jin Soo Choi, Daejeon-si (KR); Jin Woong Kim, Daejeon-si (KR); Chie Teuk Ahn, Daejeon-si (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 10 days.

(21) Appl. No.: 13/980,521

(22) PCT Filed: Jan. 20, 2012

(86) PCT No.: PCT/KR2012/000540
§ 371 (c)(1),
(2), (4) Date: Jul. 18, 2013

(87) PCT Pub. No.: WO2012/099433
PCT Pub. Date: Jul. 26, 2012

(65) Prior Publication Data
US 2013/0301944 A1  Nov. 14, 2013

(30) Foreign Application Priority Data

Jan. 20, 2011 (KR) .................. 10-2011-0005707
May 24, 2011 (KR) .................. 10-2011-0049246
Sep. 9, 2011 (KR) .................. 10-2011-0092189
Jan. 20, 2012 (KR) .................. 10-2012-0006574

(51) Int. Cl.
*G06K 9/36* (2006.01)
*G06T 9/00* (2006.01)

(52) U.S. Cl.
CPC ...................... *G06T 9/00* (2013.01)

(58) Field of Classification Search
USPC ............. 382/232, 233; 341/50, 67, 106, 107, 341/167; 331/25; 370/324, 329, 341; 704/500, 504; 375/259, 240.02, E7.144
See application file for complete search history.

(56) References Cited

U.S. PATENT DOCUMENTS 6,919,828 B2 * 7/2005 Jeon et al. ................. 341/67
8,036,471 B2 * 10/2011 Li et al. ................. 382/232

(Continued)

FOREIGN PATENT DOCUMENTS

GB    2446420    *  8/2008 ............ H03M 13/15

OTHER PUBLICATIONS

International Search Report issued Sep. 26, 2012 in counterpart International Application No. PCT/KR2012/000540 (10 pages, in Korean, including complete English translation).

*Primary Examiner* — Anh Do
(74) *Attorney, Agent, or Firm* — NSIP Law

(57) ABSTRACT

Disclosed is an entropy coding method using an index mapping table, and an apparatus using the method. An imagedecoding method comprises: a step of mapping an inputted codeword to a code number with reference to an inverse codeword mapping table, and calculating the mapped code number in a table index; and a step of updating the inverse mapping table based on the accumulated number of occurrences of the code number, the number of sequential occurrences of the code number, neighbor block encoding/decoding information, and/or threshold value information for updating the inverse index mapping table. According to the present invention, an index mapping table is realigned based on a certain condition, thereby improving encoding/decoding efficiency.

18 Claims, 31 Drawing Sheets

(56) References Cited

U.S. PATENT DOCUMENTS

| | | | |
|---|---|---|---|
| 8,645,145 B2* | 2/2014 | Subbaraman et al. | 704/500 |
| 8,649,350 B2* | 2/2014 | Yang et al. | 370/329 |
| 8,649,445 B2* | 2/2014 | Cronie et al. | 375/259 |
| 8,682,681 B2* | 3/2014 | Fuchs et al. | 704/500 |
| 2004/0070525 A1 | 4/2004 | Vassiliadis et al. | |
| 2005/0146451 A1 | 7/2005 | Kobayashi et al. | |
| 2006/0158355 A1 | 7/2006 | Jeon et al. | |
| 2009/0153378 A1 | 6/2009 | Sekiguchi et al. | |

\* cited by examiner

FIG. 6 before sorting:

| Group (Global cumulative number of times) | Code Number | Table Index |
|---|---|---|
| 1 (70) | 0 | 9 |
| 2 (20) | 1 | 7 |
| 3 (40) | 2 | 3 |
| | 3 | 12 |
| | 4 | 8 |
| | 5 | 15 |
| ... | ... | ... | table index=12 ↑

*Critical value=3 times
*Local cumulative number of times of Group 2 including Table index 12 code_number=3 ↑ after sorting:

| Group (Global cumulative number of times) | Code Number | Table Index |
|---|---|---|
| 1 (70) | 2 | 9 |
| 2 (21) | 3 | 7 |
| 3 (40) | 0 | 3 |
| | 1 | 12 |
| | 4 | 8 |
| | 5 | 15 |
| ... | ... | ... |

FIG. 8 before sorting:

| Code Number | Table Index (Global cumulative number of times) |
|---|---|
| 0 | 9(70) |
| 1 | 7(25) |
| 2 | 3(35) |
| 3 | 12(40) |
| 4 | 8(30) |
| ... | ... | table index=12 code_number=3

Consecutive number of times after sorting:

| Code Number | Table Index (Global cumulative number of times) |
|---|---|
| 0 | 9(70) |
| 4 | 7(25) |
| 2 | 3(35) |
| 1 | 12(41) |
| 3 | 8(30) |
| ... | ... |

FIG. 9 before sorting:

| Group (Global cumulative number of times) | Code Number | Table Index |
|---|---|---|
| 1 (70) | 0 | 9 |
| 2 (20) | 1 | 7 |
|  | 2 | 3 |
| 3 (40) | 3 | 12 |
|  | 4 | 8 |
|  | 5 | 15 |
| ... | ... | ... | table index=12 code_number=3 after sorting:

| Group (Global cumulative number of times) | Code Number | Table Index |
|---|---|---|
| 1 (70) | 0 | 9 |
|  | 1 | 7 |
| 2 (21) | 4 | 3 |
|  | 5 | 12 |
| 3 (40) | 2 | 8 |
|  | 3 | 15 |
| ... | ... | ... |

FIG. 12

*Critical value=
4 times->3 times

| Block B<br>Symbol value :<br>16×16/ref=0<br>Table Index=12 | Block C<br>Symbol value :<br>16×16/ref=0<br>Table Index=12 | Block D<br>Symbol value :<br>16×16/ref=0<br>Table Index=12 |
|---|---|---|
| Block A<br>Symbol value :<br>16×16/ref=0<br>Table Index=12 | Current Block<br>Symbol value :<br>16×16/ref=0<br>Table Index=12 | Next Block<br>Symbol value :<br>?/ref=?<br>Table Index=? |

FIG. 16 before sorting:

| Group | Number of times | Code Number | Table Index |
|---|---|---|---|
| 1 (Use the global cumulative number of times) | 15 | 0 | 9 |
| | 10 | 1 | 7 |
| | 11 | 2 | 3 |
| 2 (Use the local cumulative number of times) | 1 | 3 | 8 |
| | 2 | 4 | 12 |
| | 0 | 5 | 15 |
| | 0 | ... | ... | table index =12

*Critical value=twice code_number=4 after sorting:

| Group | Number of times | Code Number | Table Index |
|---|---|---|---|
| 1 (Use the global cumulative number of times) | 15 | 0 | 9 |
| | 10 | 1 | 7 |
| | 11 | 2 | 3 |
| 2 (Use the local cumulative number of times) | 0 | 3 | 12 |
| | 1 | 4 | 8 |
| | 0 | 5 | 15 |
| | 0 | ... | ... |

FIG. 19

| Number of times | Code Number | Table Index |
|---|---|---|
| 200 | 0 | 9 |
| 140 | 1 | 7 |
| 160 | 2 | 3 |
| 80 | 3 | 8 |
| ... | ... | ... |

| Weight |
|---|
| 0.5 |
| 0.4 |
| 0.3 |
| 0.2 |
| ... |

| Number of times | Code Number | Table Index |
|---|---|---|
| 100 | 0 | 9 |
| 56 | 1 | 7 |
| 48 | 2 | 3 |
| 16 | 3 | 8 |
| ... | ... | ... |

FIG. 21

Code Number=6 before sorting:

| Group (Cumulative number of times) | PredMode_PartMode | Code Number | Table Index |
|---|---|---|---|
| Counter #1 (10) | 0 | 0 | 2 |
| Counter #2 (8) | 1 | 1 | 1 |
|  | 2 | 2 | 3 |
|  | 3 | 3 | 4 |
|  | 4 | 4 | 0 |
| Counter #3 (7→8) | 5 | 5 | 6 |
|  | 6 | 6 | 7 |
|  | 7 | 7 | 5 |

Table Index=7 after sorting:

| Group (Cumulative number of times) | PredMode_PartMode | Code Number | Table Index |
|---|---|---|---|
| Counter #1 (10) | 0 | 0 | 2 |
| Counter #2 (8) | 6 | 1 | 7 |
|  | 7 | 2 | 5 |
| Counter #3 (8) | 1 | 3 | 1 |
|  | 2 | 4 | 3 |
|  | 3 | 5 | 4 |
|  | 4 | 6 | 0 |
|  | 5 | 7 | 6 |

ENTROPY CODING METHOD USING AN INDEX MAPPING TABLE, AND IMAGE-ENCODING/DECODING APPARATUS AND METHOD USING SAID ENTROPY CODING METHOD

CROSS-REFERENCE TO RELATED APPLICATIONS

This application is a U.S. national stage application under 35 USC 371 of International Application No. PCT/KR2012/000540, filed on Jan. 20, 2012, which claims the benefit of Korean Patent Application Nos. 10-2012-0006574, 10-2011-0092189, 10-2011-0049246, and 10-2011-0005707, filed on Jan. 20, 2012, Sep. 9, 2011, May 24, 2011, and Jan. 20, 2011, respectively, the entire disclosures of which are incorporated herein by reference for all purposes.

TECHNICAL FIELD

The present invention relates to image coding/decoding technology and, more particularly, to an entropy coding method using an index mapping table and an apparatus and method using the entropy coding method.

BACKGROUND ART

Recently, broadcasting service having High Definition (HD) resolution is being extended nationwide and worldwide, and thus lots of users are accustomed to an image of high resolution and high picture quality. Accordingly, a lot of institutes are giving impetus to the development of the next-image device. Furthermore, as there is a growing interest in Ultra High Definition (UHD) having resolution higher than HDTV along with HDTV, there is a need for compression technology for an image of higher resolution and higher picture quality.

For image compression, inter prediction technology for predicting a pixel value included in a current picture from an anterior picture or a posterior picture or both temporally, intra prediction technology for predicting a pixel value included in a current picture by using pixel information within a current picture, entropy coding technology for allocating a short sign to a symbol having a high frequency of appearance and allocating a long sign to a symbol having a low frequency of appearance, and so on may be used.

DISCLOSURE

Technical Problem

A first object of the present invention is to provide a method of realigning an index mapping table in order to improve image coding and decoding efficiency.

A second object of the present invention is to provide an apparatus for performing the method of realigning an index mapping table in order to improve image coding and decoding efficiency.

Technical Solution

To achieve the first object of the present invention, an image decoding method according to an aspect of the present invention may include mapping a received codeword to a specific code number with reference to an inverse codeword mapping table and calculating the mapped code number in a form of a table index and updating an inverse index mapping table on the basis of at least one of the cumulative number of times that the specific code number has been generated, the consecutive number of times that the specific code number has been generated, coding/decoding information about a peripheral block, and critical value information for updating the inverse index mapping table. If the number of times that the specific code number has been generated is greater than a specific critical value, updating the inverse index mapping table may be performed by swapping the specific code number with an upper code number having a code number value smaller than the specific code number. If code numbers included in the inverse index mapping table are classified into a plurality of code number groups and the number of times that a first code number group including the code numbers has been generated is greater than a specific critical value, updating the inverse index mapping table may be performed by swapping a code number included in a second code number group, including code numbers smaller than the code numbers of the first code number group, with a code number of the first code number group. If the consecutive number of times that the specific code number has been generated is greater than a specific critical value, updating the inverse index mapping table may be performed by swapping the specific code number with a code number smaller than the specific code number. Updating the inverse index mapping table may be performed in a specific cycle on the basis of the global cumulative number of times that the specific code number has been generated. Updating the inverse index mapping table may be performed by classifying code numbers, included in the inverse index mapping table, into a plurality of code number groups and by updating the inverse index mapping table in a specific cycle on the basis of the global cumulative number of times that each of the code numbers included in each of the code number groups has been generated. If the consecutive number of times that the specific code number has been generated is greater than a specific critical value, updating the inverse index mapping table may be performed on the basis of the global cumulative number of times that the specific code number has been generated which is calculated by applying a specific weight to the number of times that the specific code number has been generated. If the consecutive number of times that the specific code number has been generated is greater than a specific critical value, updating the inverse index mapping table may be performed on the basis of the global cumulative number of times that a code number included in the inverse index mapping table has been generated. The critical value information for updating the inverse index mapping table may be adaptively changed on the basis of the consecutive number of times that the specific code number has been generated, the cumulative number of times that the specific code number has been generated, and the decoding information of the peripheral block. If the global number of times that the specific code number has been generated is compared with the global number of times that an upper code number has been generated and, as a result of the comparison, the global number of times of the upper code number is greater than the global number of times of the specific code number, updating the inverse index mapping table may be performed by swapping the specific code number with a code number which is 1 greater than the upper code number. If the global number of times that the specific code number has been generated is compared with the global number of times that an upper code number which is 1 smaller than the specific code number and, as a result of the comparison, the global number of times of the upper code number is greater than the global number of times of the specific code number, updating the inverse index mapping table may be performed by swapping the specific code number with the upper code number. Updating the inverse index mapping table may be performed by adaptively making different the amount of a code number swapped with the specific code number on the basis of the consecutive number of times that the specific code number has been generated. Updating the inverse index mapping table may be performed by classifying code numbers, included in the inverse index mapping table, into a plurality of code number groups, using one of the global cumulative counter or the local cumulative counter for each of the code number groups, and applying a different critical value for updating an index mapping table to each of the code number groups. The image decoding method may further include normalizing the cumulative number of times of the inverse index mapping table when the cumulative number of times of the inverse index mapping table is a specific value or higher. Normalizing the cumulative number of times of the inverse index mapping table may be performed by dividing the cumulative number of times that each symbol has been generated by a maximum value/a minimum value of the cumulative number of times, dividing the cumulative number of times that each symbol has been generated by ½ or a specific value when the cumulative number of times that each symbol has been generated is the specific value or higher, and applying a different weight to the cumulative number of times each symbol has been generated. Updating the inverse index mapping table may be performed when a difference value between the cumulative number of times that an upper code number has been generated and the cumulative number of times that the specific code number has been generated is greater than a specific critical value or higher on the basis of the difference value. If a plurality of symbols is merged and coded into a merged symbol, updating the inverse index mapping table may be performed by grouping code numbers for indexing the merged symbol according to a character of a symbol, counting the number of times that the symbol has been generated by using one counter in one of the groups, and swapping the code numbers for every group.

To achieve the second object of the present invention, an image decoding apparatus according to an aspect of the present invention may include a table index calculation unit for mapping a received codeword to a code number with reference to an inverse codeword mapping table and calculating the mapped code number in a form of a table index and an inverse index mapping table calculation unit for updating an inverse index mapping table based on at least one of the cumulative number of times that the code number has been generated, the consecutive number of times that the code number has been generated, coding/decoding information about a peripheral block, and critical value information for updating the inverse index mapping table.

Advantageous Effects

As described above, in accordance with the entropy coding method using an index mapping table and the apparatus using the method according to the embodiments of the present invention, coding/decoding efficiency can be improved by realigning an index mapping table according to a specific condition.

DESCRIPTION OF DRAWINGS

FIG. 6 is a conceptual diagram showing a method of updating an index mapping table according to an embodiment of the present invention;

FIG. 8 is a conceptual diagram showing a method of updating an index mapping table according to an embodiment of the present invention;

FIG. 9 is a conceptual diagram showing a method of updating an index mapping table according to an embodiment of the present invention;

FIG. 12 is a conceptual diagram showing a method of updating an index mapping table according to an embodiment of the present invention;

FIG. 16 is a conceptual diagram showing a method of updating an index mapping table according to an embodiment of the present invention;

FIG. 19 is a conceptual diagram showing a method of updating an index mapping table according to an embodiment of the present invention;

FIG. 21 is a conceptual diagram showing a method of updating an index mapping table according to an embodiment of the present invention;

MODE FOR INVENTION

Figure 1:
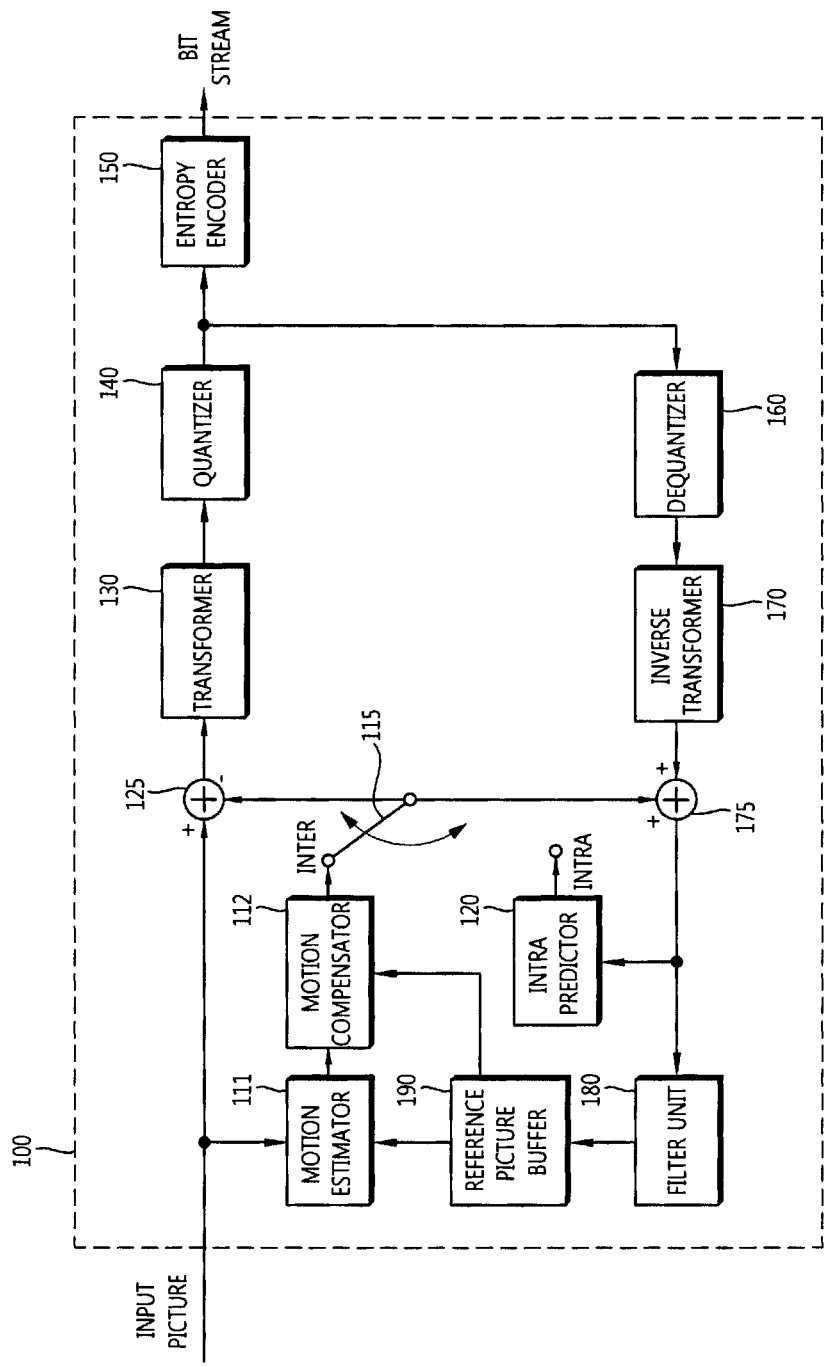
FIG. 1 is a block diagram showing an image coding apparatus according to an embodiment of the present invention.

The present invention may be modified in various ways, and they may have several embodiments. Specific embodiments of the present invention are illustrated in the drawings and described in detail in the detailed description. However, the present invention is not intended to be limited to the specific embodiments, and it should be understood that the present invention includes all modifications, equivalents, or substitutions which fall within the spirit and technical scope of the present invention. The same reference numbers will be used throughout the drawings to refer to the same or like parts.

Terms, such as the first and the second, may be used to describe various elements, but the elements should not be restricted by the terms. The terms are used to only distinguish one element and the other element from each other. For example, a first element may be named a second element without departing from the scope of the present invention. Likewise, a second element may be named a first element. A term, such as and/or, includes a combination of a plurality of pertinent and described items or any one of a plurality of pertinent and described items.

If one element is described to be "connected" or "coupled" to the other element, the one element may be directly connected or coupled to the other element, but it should be understood that a third element may exist between the two elements. On the other hand, if one element is described to be "directly connected" or "directly coupled" to the other element, it should be understood that a third element does not exist between the two elements.

The terms used in this application are used to only describe the specific embodiments and are not intended to restrict the present invention. An expression of the singular number includes an expression of the plural number unless clearly defined otherwise in the context. In this application, terms, such as "comprise" or "have", are intended to designate that characteristics, numbers, steps, operations, elements, or parts which are described in the specification, or a combination of them exist, and should be understood that they do not previously exclude the existence or possible addition of one or more other characteristics, numbers, steps, operations, elements, parts, or combinations of them.

Hereinafter, preferred embodiments of the present invention will be described in detail with reference to the accompanying drawings. The same reference numerals designate the same elements throughout the drawings, and a redundant description of the same elements is omitted.

FIG. 1 is a block diagram showing an image coding apparatus according to an embodiment of the present invention.

Referring to FIG. 1, the image coding apparatus 100 includes a motion prediction unit 111, a motion compensation unit 112, an intra-prediction unit 120, a switch 115, a subtracter 125, a transform unit 130, a quantization unit 140, an entropy coding unit 150, an inverse quantization unit 160, an inverse transform unit 170, an adder 175, a filter unit 180, and a reference image buffer 190.

The image coding apparatus 100 performs coding for an input image in an intra mode or an inter mode and outputs a bit stream. In the following embodiments of the present invention, intra-prediction and intra-screen prediction may be used as the same meaning, and inter-prediction and inter-screen prediction may be used as the same meaning. In order to determine an optimal prediction method for a prediction unit, an intra-screen prediction method and an inter-screen prediction method may be selectively used for the prediction unit. The image coding apparatus 100 generates a prediction block for the original block of the input image and then decodes a difference between the original block and the prediction block.

In case of the intra-screen prediction mode, the intra-prediction unit 120 (or an intra-screen prediction unit may be used as a term having the same meaning as the intra-prediction unit 120) generates a prediction block by performing spatial prediction using the pixel values of already coded blocks adjacent to a current block.

In case of the inter-screen prediction mode, the motion prediction unit 111 calculates a motion vector by searching a reference image, stored in the reference image buffer 190, for an area most well matched with an input block in a motion prediction process. The motion compensation unit 112 generates a prediction block by performing motion compensation using a motion vector.

The subtracter 125 generates residual blocks on the basis of the difference between the input block and the generated prediction block. The transform unit 130 performs transform for the residual blocks and outputs a transform coefficient. Furthermore, the quantization unit 140 quantizes the transform coefficient according to a quantization parameter and outputs the quantized coefficient. The entropy coding unit 150 performs entropy coding for the quantized coefficient according to a probability distribution and outputs a bit stream.

The entropy coding unit 150 according to the embodiment of the present invention may map inputted codewords to code numbers with reference to a codeword mapping table, calculate the mapped code numbers as table indices, and update an index mapping table on the basis of at least one of the cumulative number of times that a code number has been generated, the consecutive number of times that a code number has been generated, coding/decoding information about the peripheral blocks, and critical value information for updating the index mapping table.

In HEVC, a current coded image needs to be decoded and stored in order for the current coded image to be used as a reference image because inter-prediction coding (i.e., inter-screen prediction coding) is performed. Accordingly, the quantized coefficient is subject to inverse quantization in the inverse quantization unit 160 and is subject to inverse transform in the inverse transform unit 170. An inverse quantization coefficient and an inverse transformed coefficient are added to the prediction block through the adder 175, so that a restored block is generated.

The restored block is inputted to the filter unit 180. The filter unit 180 may apply one or more of a deblocking filter, a Sample Adaptive Offset (SAO), and an Adaptive Loop Filter (ALF) to the restored block or the restored picture. The filter unit 180 may also be called an adaptive in-loop filter. The deblocking filter can remove block distortion occurring at the boundary of blocks. The SAO can add a proper offset value to a pixel value in order to compensate for a coding error. The ALF can perform filtering on the basis of a value obtained by comparing a restored image with an original image, and the ALF may be performed only when high efficiency is applied. The restored block passing through the filter unit 180 is stored in the reference image buffer 190.

Figure 2:
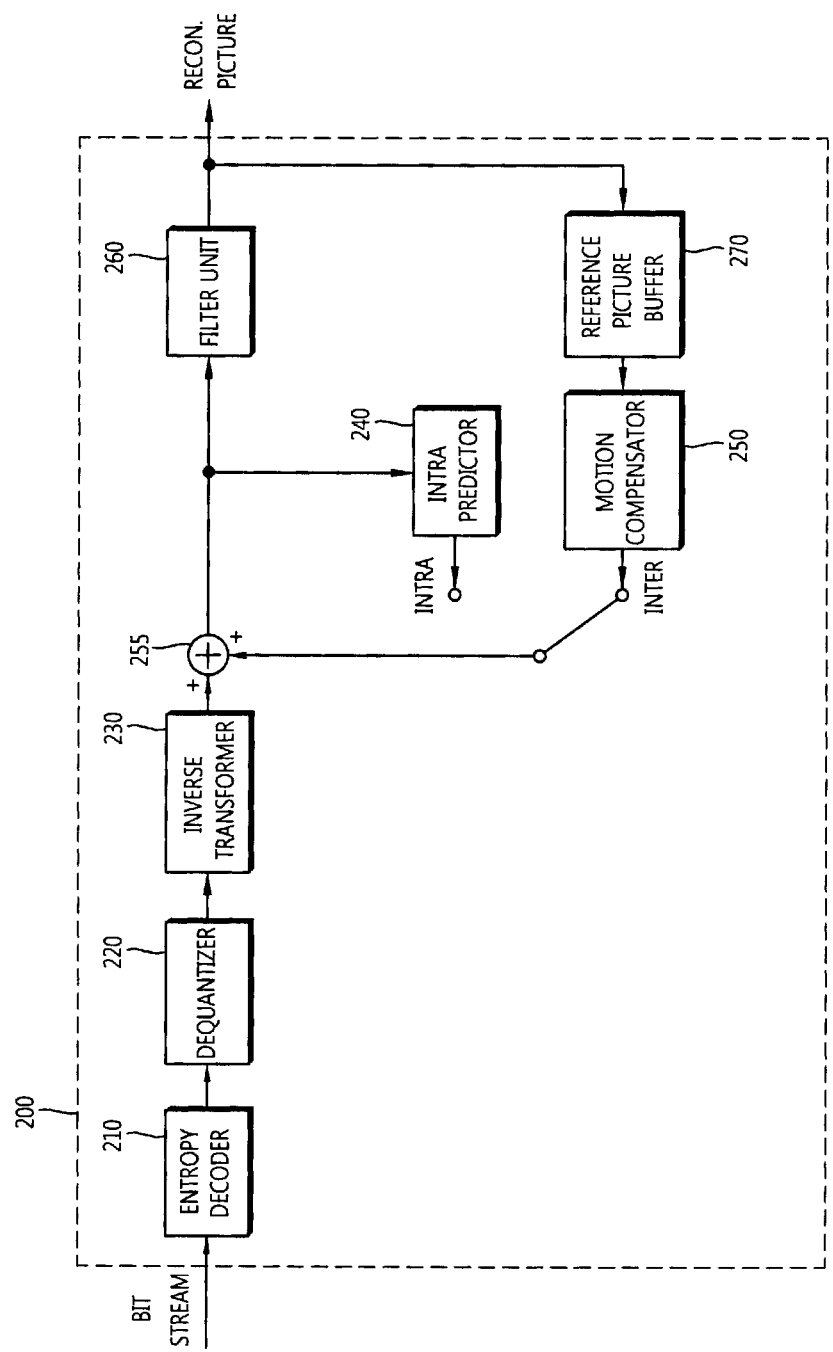
FIG. 2 is a block diagram showing the construction of an image decoding apparatus according to another embodiment of the present invention.

FIG. 2 is a block diagram showing the construction of an image decoding apparatus according to another embodiment of the present invention.

Referring to FIG. 2, the image decoding apparatus 200 includes an entropy decoding unit 210, an inverse quantization unit 220, an inverse transform unit 230, an intra-prediction unit 240, a motion compensation unit 250, a filter unit 260, and a reference image buffer 270.

The image decoding apparatus 200 receives a bit stream from an encoder, performs decoding for the bit stream in the intra mode or the inter mode, and outputs a reconfigured image (i.e., a restored image). In case of the intra mode, a prediction block is generated using the intra-screen prediction mode. In case of the inter mode, a prediction block is generated using the inter-screen prediction method. The image decoding apparatus 200 obtains residual blocks from the received bit stream, generates a prediction block, and generates a reconfigured block (i.e., a restored block) by adding the residual blocks to the prediction block.

The entropy decoding unit 210 outputs a quantized coefficient by performing entropy decoding for a received bit stream according to a probability distribution. The quantized coefficient is subject to inverse quantization in the inverse quantization unit 220 and to inverse transformed in the inverse transform unit 230. As a result, residual blocks are generated.

The entropy decoding unit 210 according to the embodiment of the present invention may map inputted codewords to code numbers with reference to an inverse codeword mapping table, calculate the mapped code numbers as table indices, and update an inverse index mapping table on the basis of at least one of the cumulative number of times that a code number has been generated, the consecutive number of times that a code number has been generated, coding/decoding information about a peripheral block, and critical value information for updating an inverse index mapping table.

In case of the intra-screen prediction mode, the intra-prediction unit 240 (or an inter-screen prediction unit) generates a prediction block by performing spatial prediction using the pixel values of already coded blocks adjacent to a current block.

In case of the inter-screen prediction mode, the motion compensation unit 250 generates a prediction block by performing motion compensation using a motion vector and a reference image stored in the reference image buffer 270.

The residual blocks are added to the prediction block in the adder 255. The added blocks pass through the filter unit 260. The filter unit 260 may apply one or more of the deblocking filter, the SAO, and the ALF to the restored block or the restored picture. The filter unit 260 outputs a reconfigured image (i.e., a restored image). The restored image is stored in the reference image buffer 270 and may be used for inter-screen prediction.

A method of improving the prediction performance of a coding/decoding apparatus includes a method of increasing the accuracy of an interpolation image and a method of predicting a difference signal. The difference signal is a signal indicating a difference between an original image and a prediction image. In the present invention, the "difference signal" may also be replaced with a "differential signal", a "residual block", or a "differential block" according to a sentence. A person having ordinary skill in the art may distinguish the differential signal, the residual block, and the differential block from each other within a range not affecting the spirit and gist of the invention.

As described above, in the following embodiments of the present invention, a coding unit is used, for convenience of description, but the coding unit may also be a unit for performing decoding as well as coding. Coding/decoding methods using the intra-screen prediction mode using two candidate intra-prediction modes which are described with reference to FIGS. 3 to 10 according to embodiments of the present invention may be implemented according to the function of each of the modules described above with reference to FIGS. 1 and 2, and the encoder and the decoder are included in the scope of the present invention. That is, in the embodiments of the present invention, an image coding method and an image decoding method to be described later may be performed by the elements included in the image encoder and the image decoder described above with reference to FIGS. 1 and 2. The meaning of the elements may include not only a meaning in terms of hardware, but also a software processing unit that may be performed by an algorithm.

Figure 3:
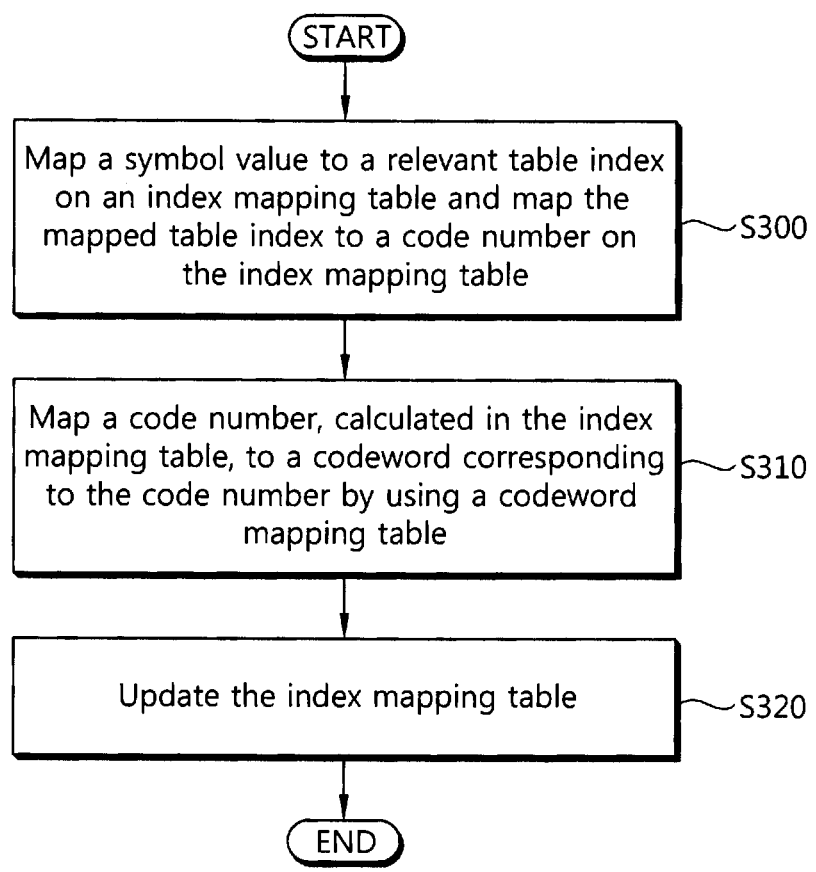
FIG. 3 is a flowchart illustrating an entropy coding method according to an embodiment of the present invention.

FIG. 3 is a flowchart illustrating an entropy coding method according to an embodiment of the present invention.

Referring to FIG. 3, a symbol value is mapped to a relevant table index on an index mapping table, and the mapped table index is mapped to a code number on the index mapping table (step S300).

In the following embodiments of the present invention, the symbol value is a syntax element value, and it may be a value to represent a transform coefficient value, a prediction mode, a cbf, or a ref index. The symbol values may be calculated as the table indices through an enumeration process. In the following embodiments of the present invention, the value obtained by enumerating the symbol value and the table to which the code number has been mapped is defined and used as the index mapping table, but a sorting table not the index mapping table may also be defined and used.

Figure 4:
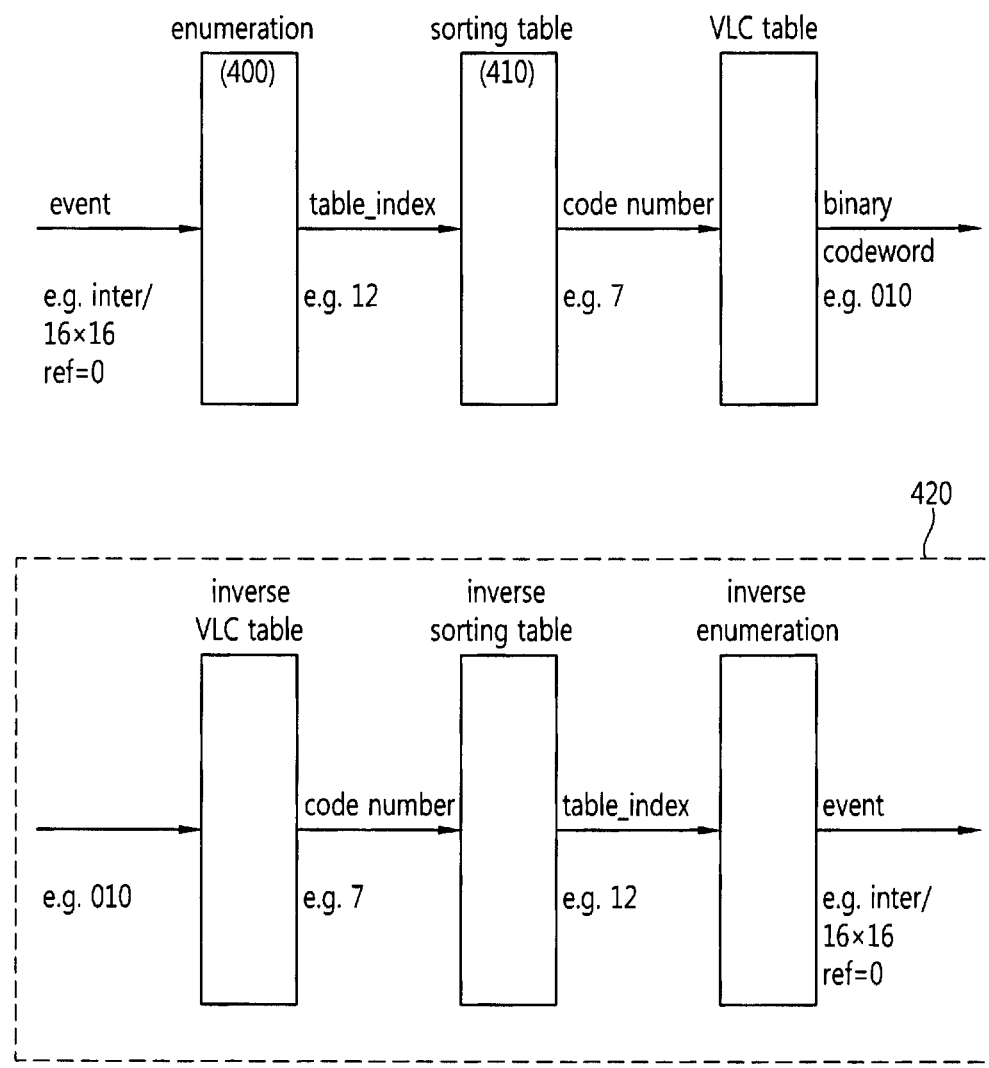
FIG. 4 is a conceptual diagram showing a process of a symbol value being mapped to a code number according to an embodiment of the present invention.

FIG. 4 is a conceptual diagram showing a process of a symbol value being mapped to a code number according to an embodiment of the present invention.

Referring to FIG. 4, a specific symbol value is calculated as a table index through an enumeration process (400).

The calculated table index is calculated as a code number by using an index mapping table (410).

The index mapping table may include a table index to which a symbol value is mapped and a code number to which the table index is mapped. Whenever a specific symbol value is generated, an index mapping table is updated by updating a table index, corresponding to the specific symbol value on an index mapping table, and a code number mapped to the table index so that a symbol value having a high occurrence probability can be mapped to a short codeword. The decoder may decode codeword information like the encoder in a reverse direction.

Referring back to FIG. 3, the code number calculated in the index mapping table is mapped to a codeword corresponding to the code number by using a codeword mapping table as in FIGS. 4 to 22 (step S310). The codeword may be generated using a variety of binary coding methods according to a symbol.

The index mapping table is updated (step S320).

In order to update the index mapping table, at least one of the cumulative number of times that a code number has been generated, the consecutive number of times that a code number has been generated, coding/decoding information about a peripheral block, and critical value information for updating an inverse index mapping table may be used.

The cumulative number of times that a symbol value has been generated for updating an index mapping table may be the local cumulative number of times or the global cumulative number of times. The global cumulative number of times is a value indicating the cumulative number of times that a table index corresponding to each symbol has been generated and is not reset. Furthermore, the global cumulative number of times may be a value for comparing probabilities that each symbol value or each table index is generated with each other. The global cumulative number of times is not reset although a specific critical value is satisfied. The local cumulative number of times is the cumulative number of times that a table index corresponding to each symbol has been generated and may be reset when a specific value, such as a preset critical value, is satisfied. Here, the critical value is set using surrounding coding information. The critical value may become a value to determine whether an index mapping table will be updated if the local cumulative number of times is greater than or equal to the critical value as a result of comparison with the local cumulative number of times according to a predetermined condition. For example, a critical value of 3 may mean that an index mapping table is updated when the local cumulative number of times is 3 or higher or the local cumulative number of times exceeds 3.

According to an embodiment of the present invention, the local cumulative number of times and the global cumulative number of times may be calculated for every symbol value or may be calculated by grouping several symbols. Furthermore, according to an embodiment of the present invention, if the global cumulative number of times exceeds a specific value, normalization may be performed. Normalization may be performed by using various methods, such as a method of dividing the cumulative number of times that each symbol has been generated by a maximum value and a minimum value of the cumulative number of times, a method of dividing the cumulative number of times that each symbol has been generated by ½ or a specific value when the cumulative number of times that each symbol has been generated is a specific value or higher, and a method of applying a different weight to the cumulative number of times.

Furthermore, in order to update the index mapping table, the consecutive number of times that a symbol value has been generated may be used. If a specific symbol value is consecutively generated, it is assumed that there is a high possibility that the same symbol value will be generated in a next block. Accordingly, whether to update the index mapping table may be determined by determining whether a specific symbol is consecutively generated. The consecutive number of times may also be calculated by group by grouping symbol values.

Furthermore, according to an embodiment of the present invention, the index mapping table may be updated on the basis of coding information about peripheral blocks. The index mapping table may be updated by using pieces of information, such as the symbol values, the code numbers, etc. of peripheral blocks.

Figure 5:
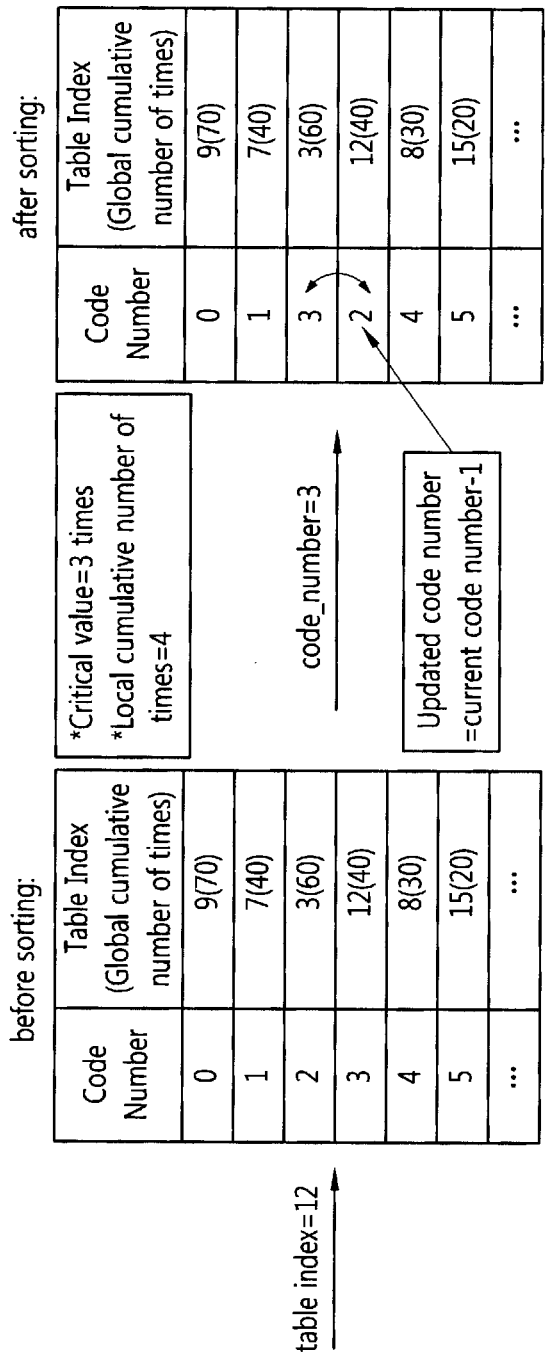
FIG. 5 is a conceptual diagram showing a method of updating an index mapping table according to an embodiment of the present invention.

FIG. 5 is a conceptual diagram showing a method of updating an index mapping table according to an embodiment of the present invention.

Whether to update the index mapping table may be determined by comparing the local cumulative number of times that a symbol value or a table index has been generated with a critical value. In the following embodiment of the present invention, a method of counting the number of times that a table index has been generated and swapping a code number is disclosed, for convenience of description. In another embodiment of the present invention, however, the table index may be swapped. This embodiment also falls within the scope of the present invention.

The critical value is a predetermined value and may become the number of times that a table index has been generated. Furthermore, the critical value may be different according to a specific unit, such as a frame or slice and may be differently applied to each symbol.

Referring to FIG. 5, it is assumed that a specific table index 12 has been generated and a critical value is 3 times. If a value corresponding to 12 (i.e., a table index) is generated 3 times before the current table index 12 is generated, the table index 12 on an index mapping table has 4 times because the table index 12 is now generated. The index mapping table may be updated because 4 times is greater than 3 times (i.e., the critical value).

In order to update the index mapping table, a code number 3 mapped to the table index 12 on the index mapping table may be swapped with a code number 2 corresponding to a table index 3 on an upper table index. That is, a code number that is 1 smaller than a code number mapped to a current table index may be swapped with the code number mapped to the table index.

If the local cumulative number of times that a specific symbol value has been generated reaches a critical value, a value of a local cumulative counter which will be compared with the critical value may be reset unlike in a global cumulative counter.

FIG. 6 is a conceptual diagram showing a method of updating an index mapping table according to an embodiment of the present invention.

Referring to FIG. 6, the index mapping table may be updated by grouping symbols, calculating the local cumulative number of times that each group has been generated, and comparing the local cumulative number of times for each group with a critical value.

If a table index 12 is generated, the global cumulative number of times that an index group including a table index has been generated and the local cumulative number of times that the index group including the table index has been generated may be increased by 1. If the cumulative number of times that an index group including an intra-screen prediction mode value corresponding to the table index has been generated is greater than the critical value as a result of comparison between the increased cumulative number of times and the critical value, the index mapping table may be updated. The index mapping table may be updated by using a method of swapping a code number, mapped to a current index group, the code number of an upper index group mapped to a code number smaller than the current index group by group.

Figure 7:
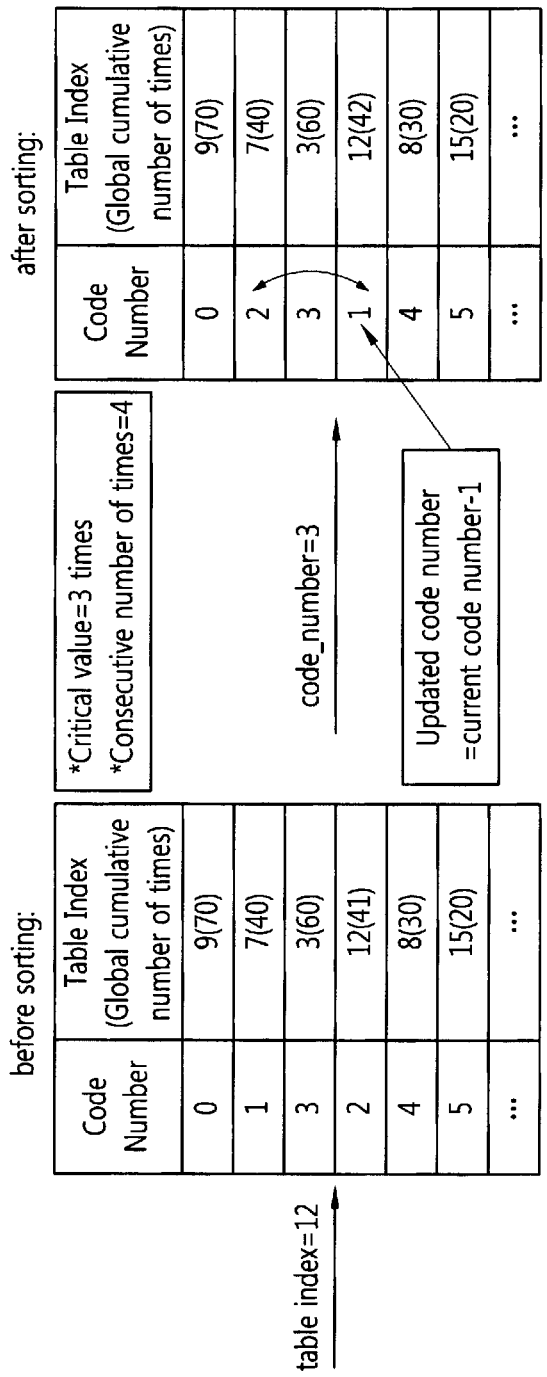
FIG. 7 is a conceptual diagram showing a method of updating an index mapping table according to an embodiment of the present invention.

FIG. 7 is a conceptual diagram showing a method of updating an index mapping table according to an embodiment of the present invention.

Referring to FIG. 7, the index mapping table may be updated on the basis of the consecutive number of times.

For example, it is assumed that a critical value of the consecutive number of times is 3. If the consecutive number of times that a current table index has been generated is 4, the index mapping table may be updated. If a table index 12 is generated and the consecutive number of times is 4 greater than a critical value, a code number smaller than a code number mapped to a current table index may be swapped with the code number of the current table index. Since the code number mapped to the table index 12 is 2, a code number 1 that is 1 smaller than 2 may be swapped with the code number, and thus the code number 1 may be used as the code number mapped to the current table index 12.

FIG. 8 is a conceptual diagram showing a method of updating an index mapping table according to an embodiment of the present invention.

Referring to FIG. 8, the index mapping table may be realigned on the basis of the global cumulative number of times. For example, if a table index 12 is generated, the global cumulative number of times that a table index has been generated may be increased by 1, and all the code numbers on the index mapping table may be realigned on the basis of the increased global cumulative number of times. The global cumulative number of times may be updated when a specific unit, such as a frame or slice, is changed. That is, an updated index mapping table may be used when the cumulative number of times is stored for every frame or slice and a next frame or slice is coded on the basis of the cumulative number of times. For another example, the index mapping table may be updated for every cycle by determining the cycle within a specific unit.

As a method of updating an index mapping table on the basis of the global cumulative number of times, if a specific symbol is generated, a code number may be changed in a descending powers on the basis of the number of times that other indices on the index mapping table have been generated by changing the number of times that the relevant symbol has been generated.

If a specific table index is consecutively generated without increasing the global cumulative number of times one by one according to a generated table index, the global cumulative number of times may be increased according to a weight (e.g., when a specific table index is consecutively generated 3 times, the cumulative number of times may be increased by 2 not 1).

Furthermore, if a specific critical value is set and the global cumulative number of times is the critical value or higher, a method of swapping code numbers on a table index may be used. For example, assuming that the cumulative number of times that a code number smaller than a code number mapped to a current table index has been generated is set as a critical value, only when the cumulative number of times exceeds the critical value, mapped code numbers on a table index may be swapped.

FIG. 9 is a conceptual diagram showing a method of updating an index mapping table according to an embodiment of the present invention.

Referring to FIG. 9, the table indices of the index mapping table may be classified into specific index groups and then mapped. The global cumulative number of times may be increased by group, and the index mapping table may be updated by changing the mapping of the code numbers on the basis of the increased global cumulative number of times. If a table index 12 is generated, the global cumulative number of times that a group corresponding to the table index 12 has been generated may be increased, and the index mapping table may be realigned on the basis of the global cumulative number of times.

Figure 10:
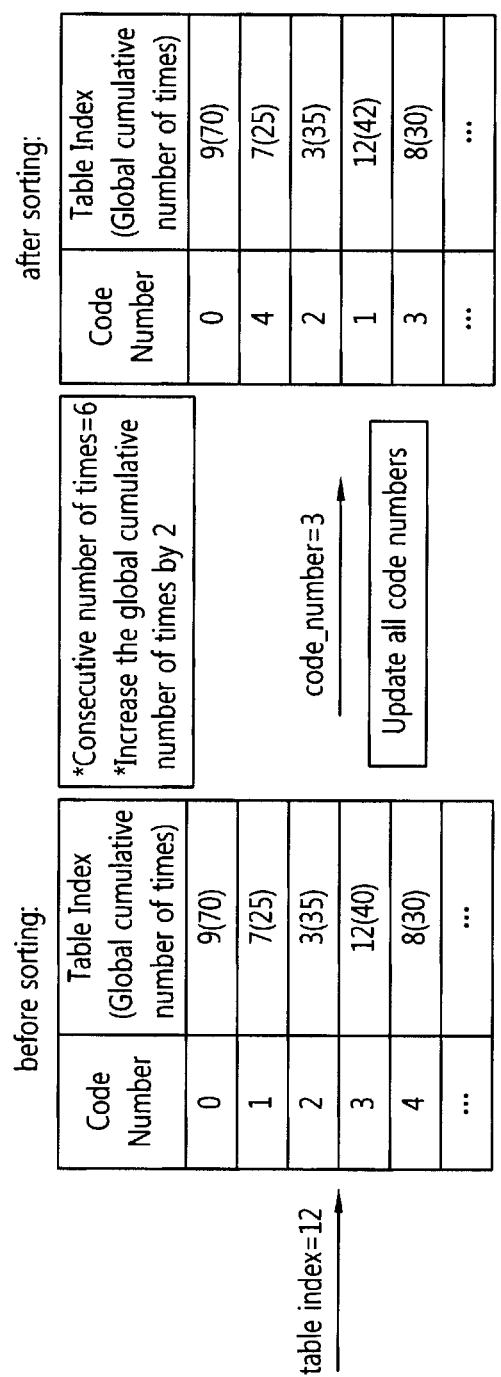
FIG. 10 is a conceptual diagram showing a method of updating an index mapping table according to an embodiment of the present invention.

FIG. 10 is a conceptual diagram showing a method of updating an index mapping table according to an embodiment of the present invention.

Referring to FIG. 10, if a specific table index is consecutively generated in the index mapping table, the global cumulative number of times that a specific table index has been generated may be calculated by using a method of increasing a value in which a weight not 1 is applied to the global cumulative number of times.

For example, assuming that the consecutive number of times to which a weight is applied is 3, if a specific table index is consecutively generated 3 times or more, if the specific table index is consecutively generated, the global number of times that the table index has been generated may be increased by applying a weight 2 not a weight 1 to the global cumulative number of times.

Figure 11:
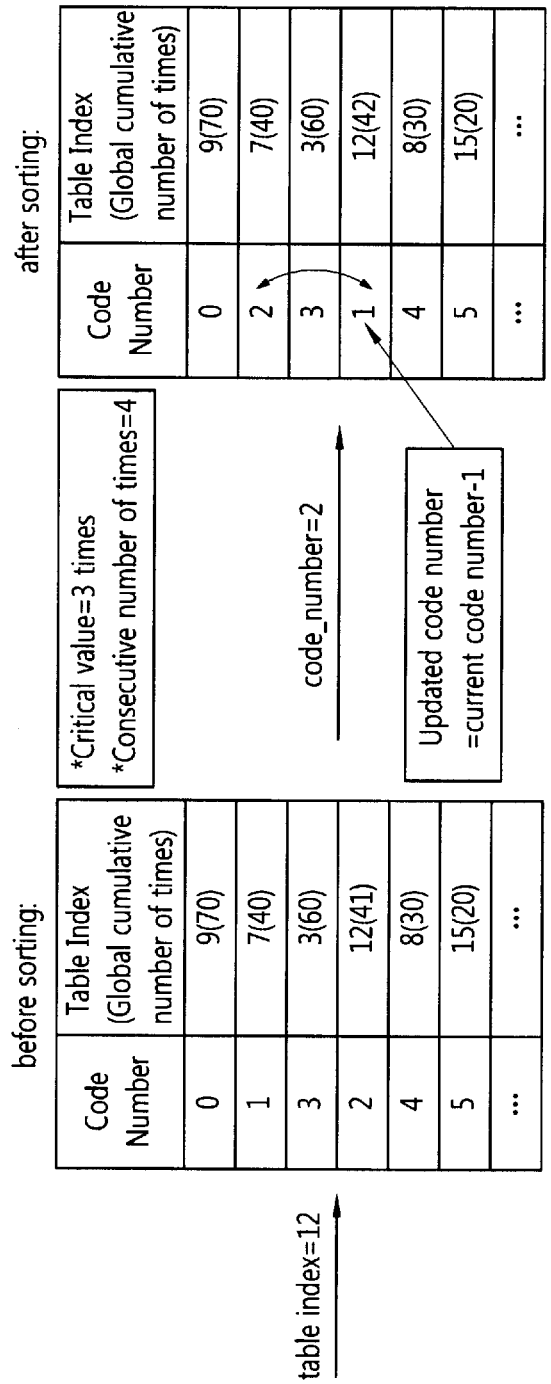
FIG. 11 is a conceptual diagram showing a method of updating an index mapping table according to an embodiment of the present invention.

FIG. 11 is a conceptual diagram showing a method of updating an index mapping table according to an embodiment of the present invention.

Referring to FIG. 11, assuming that the consecutive number of times that a specific symbol has been generated is set as a critical value, if the specific symbol is consecutively generated by the specific number of times or more, the index mapping table may be updated on the basis of the global cumulative number of times that the specific symbol has been generated. For example, assuming that a critical value of the consecutive number of times is set to 3, if a table index 12 is generated and the table index 12 has been previously generated 3 times, the index mapping table may be updated when the critical value is exceeded because the consecutive number of times is 4. The index mapping table may be updated by using a method of swapping a code number, mapped to a current table index, with a code number smaller than a code number mapped to the current table index.

In accordance with an embodiment of the present invention, a method of changing a preset critical value under a specific condition may be used. For example, if a specific symbol is consecutively generated, a preset critical value may be reduced. If a critical value that the existing index mapping table is updated is 4 times when a specific symbol is consecutively generated 7 times, the index mapping table may be updated more quickly times when the specific symbol is consecutively generated by reducing the critical value to 3. Furthermore, the critical value may be adjusted according to the cumulative number of times. For example, if the global cumulative number of times that a specific symbol has been generated is 30% or higher, the index mapping table may be updated more rapidly by using a method of changing the existing critical value 4 into a critical value 3.

FIG. 12 is a conceptual diagram showing a method of updating an index mapping table according to an embodiment of the present invention.

Referring to FIG. 12, a critical value may be adjusted on the basis of pieces of coding information about peripheral blocks. For example, if the symbol values of peripheral blocks are equal to a target symbol value, a critical value may be reduced from 4 to 3. If pieces of coding information (e.g., a block size, a reference picture, and a motion vector) about blocks coded before the symbol value of a current block are the same as that of the current block and the coding information is generated by the specific number of times, a critical value may be changed. In other words, if there are many neighboring coded blocks having the same symbol value as a current block, a probability that the same symbol value may be generated in a next block is high. Accordingly, the same block may be coded and decoded by using a short codeword value when the same block is coded and decoded so that code numbers can be updated more easily on an index mapping table by reducing the critical value. How many peripheral blocks must have the same symbol value as the current block may be adaptively changed according to the consecutive number of times that the same symbol value is generated.

In accordance with an embodiment of the present invention, an amount that a code number corresponding to a table index on an index mapping table is updated may be different.

In accordance with an embodiment of the present invention, when an index mapping table is updated, not only a method of swapping a symbol value or the code number of a table index corresponding to the symbol value with a one level upper code number (i.e., a method of swapping the code number of a table index corresponding to a current symbol value with a code number that is 1 smaller than the code number of the table index corresponding to the current symbol value), but also a method of swapping the code number of a table index corresponding to a symbol value with a one level or higher code number (i.e., a code number that is 2 or more smaller than a current code number) by taking various factors, such as the cumulative/consecutive number of times that the symbol value has been generated and peripheral pieces of coding information, into consideration when an index mapping table is updated. If a current code number is swapped with a one level upper code number, an updated code number may be represented by a maximum (i.e., 0, and the current code number is −1). If a current code number is swapped with a one level or upper code number, an updated code number becomes a maximum (i.e., 0, and the current code number is −a). Here, 'a' may be a variable that may be changed by various factors. A code number may become high as the variable 'a' is increased. In the following embodiments of the present invention, the variable, such as 'a', may be defined and used as an update variable. For example, the update variable may be changed according to the consecutive number of times that a table index or a symbol has been generated. For example, if a symbol or a table index is consecutively generated 3 times, a current code number may be swapped with a two-level upper code number not a one level small code number. If a symbol or a table index is consecutively generated 5 times, a current code number may be swapped with a three level low code number not a one level small code number.

Figure 13:
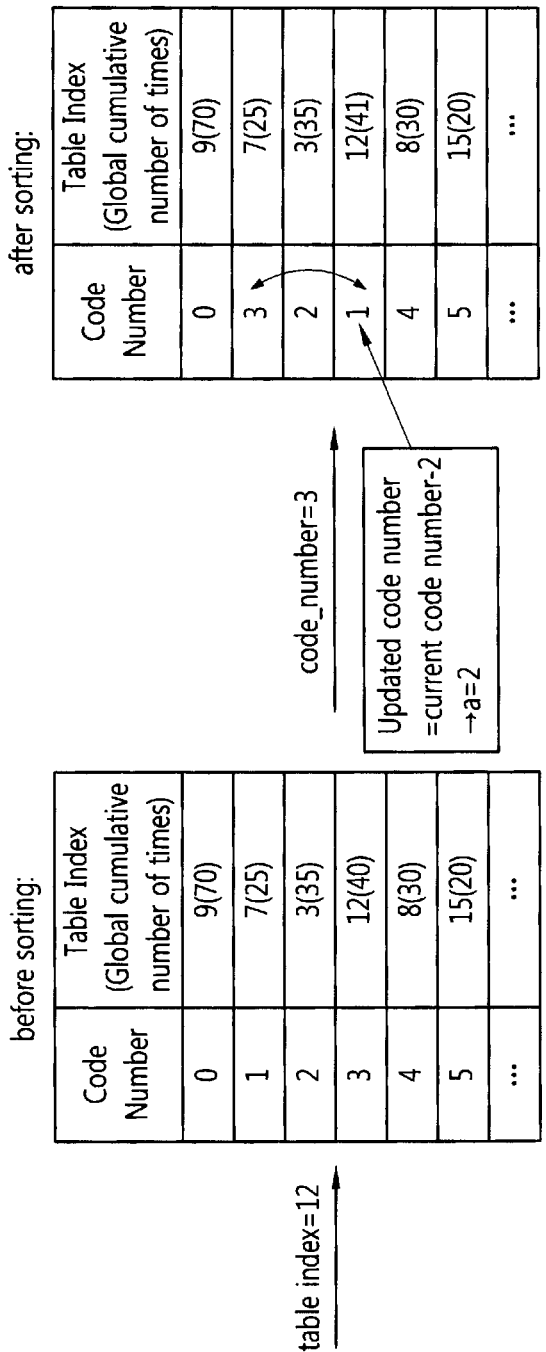
FIG. 13 is a conceptual diagram showing a method of updating an index mapping table according to an embodiment of the present invention.

FIG. 13 is a conceptual diagram showing a method of updating an index mapping table according to an embodiment of the present invention.

Referring to FIG. 13, when the index mapping table is changed using a global cumulative variable, a current code number may be swapped with a code number that is 1 greater than a code number having the global cumulative number of times that a current table index has been generated which is greater than the global cumulative number of times that the current table index has been generated, not a right upper code number, on the basis of the specific global cumulative number of times. For example, if the global cumulative number of times that a current table index has been generated is 41, an index mapping table may be updated by changing a value that is 1 greater than 0 (i.e., a code number corresponding to the global cumulative number of times 70 greater than 41) into the code number of the current table index. That is, if the global cumulative number of times is small although all the table indices, having the code number of a current table index and higher code numbers, have code numbers higher than the current table index after comparing the global cumulative number of times of all the table indices with each other, the code number of a table index having the smallest code number, from among the table indices, may be swapped with the code number of the current table index.

When an index mapping table is updated, an update variable is not increased until an upper table index having a higher probability than the table index of a target coding symbol is generated, but a maximum value that the update variable can be changed may be designated.

Figure 14:
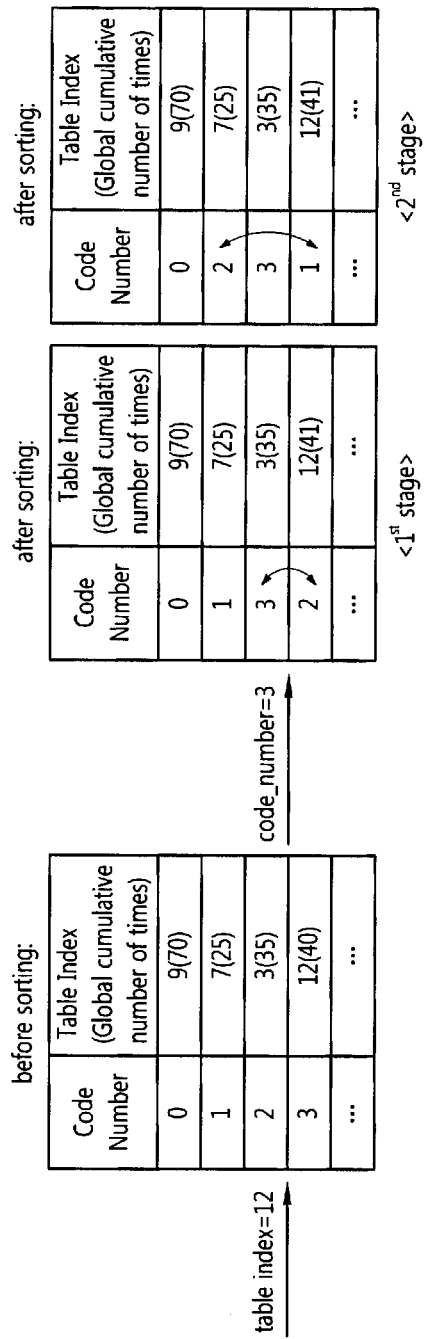
FIG. 14 is a conceptual diagram showing a method of updating an index mapping table according to an embodiment of the present invention.

FIG. 14 is a conceptual diagram showing a method of updating an index mapping table according to an embodiment of the present invention.

Referring to FIG. 14, an operation of swapping code numbers may be performed though a plurality of steps.

For example, as a first step, if a table index 12 is generated, the global cumulative variable of a table index has 41 increased by 1. If the global cumulative variable of a table index mapped to a code number 2 that is 1 smaller than a code number 3 mapped to the table index 12 is smaller than the global cumulative variable of the code number 3 as a result of comparison, the code number 3 and the code number 2 may be swapped with each other.

As a next step, if the global cumulative variable of a table index mapped to a code number 1 that is higher than a code number 2 is smaller than the global cumulative variable of a table index 12 mapped to the code number 2 through the code number swapping step as a result of comparison, the code number 2 of the table index 12 may be swapped with the code number 1. In other words, unlike in FIG. 13, the code numbers of the index mapping table may swapped on the basis of the global cumulative variable of a table index mapped to an upper code number step by step.

Figure 15:
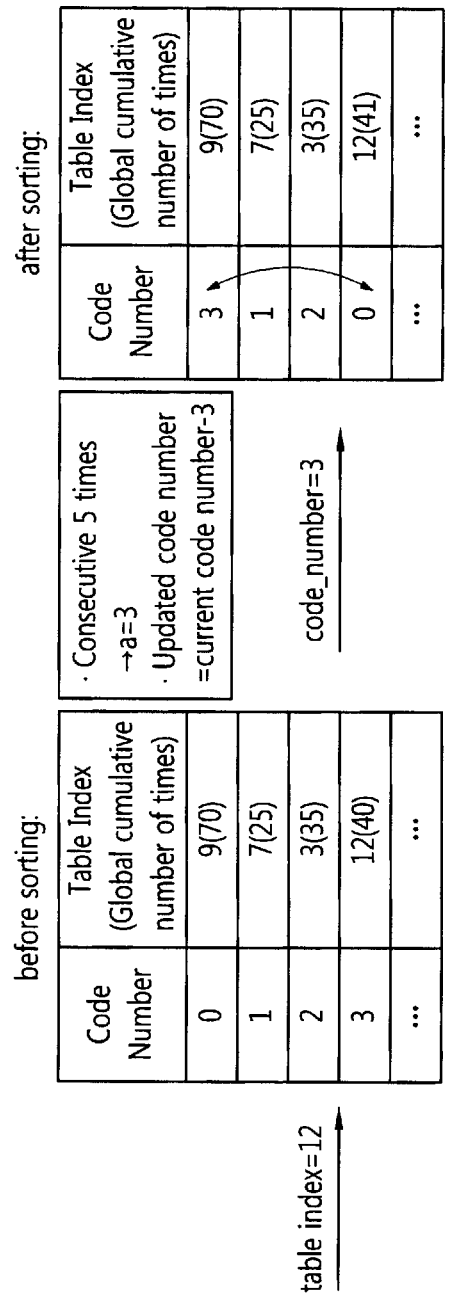
FIG. 15 is a conceptual diagram showing a method of updating an index mapping table according to an embodiment of the present invention.

FIG. 15 is a conceptual diagram showing a method of updating an index mapping table according to an embodiment of the present invention.

Referring to FIG. 15, when the index mapping table is updated, a plural-level high code number may be used as a code number that is swapped when a specific symbol or an index mapping table is consecutively generated by the specific number of times. For example, assuming that a code number updated when a specific table index is consecutively generated 5 times is a value obtained by subtracting 3 from a current code number, if a table index 12 is generated and the number of times that the table index has been generated is 5, a value 0 obtained by subtracting 3 from a code number mapped to the table index 12 may be mapped to the table index 12. That is, if a specific symbol is consecutively generated, an index mapping table may be updated more rapidly by swapping the code number of the specific symbol with a plural-level upper code number.

Furthermore, in accordance with an embodiment of the present invention, in the method of updating an index mapping table, the number of times that an alignment table is updated may be differently set according to a specific unit, such as a coding unit, a frame, a slice, or a GOP. For example, complexity generated when an index mapping table is updated can be reduced by using a method of updating the index mapping table by applying 2 cycles to the frame and 10 cycles to the GOP.

An index mapping table may be updated by classifying the index mapping table into some groups and using the global cumulative number of times and the local cumulative number of times by group. For example, an index mapping table may be divided into a first group and a second group, and a global cumulative counter may be used in the first group and a local cumulative counter may be used in the second group. Furthermore, the index mapping table may be updated by applying different critical values to the first group and the second group. For example, in order to update the index mapping table, the global cumulative number of times that a table index belonging to the first group has been generated may be used in the first group, and the local cumulative number of times that a table index belonging to the second group has been generated may be used in the second group.

FIG. 16 is a conceptual diagram showing a method of updating an index mapping table according to an embodiment of the present invention.

Referring to FIG. 16, the index mapping table may be updated by using the global cumulative number of times for a first group and may be updated by using the local cumulative number of times for the second group.

For example, if a table index 12 is generated, the cumulative number of times for a second group that counts the local cumulative number of times may be increased because the table index 12 belongs to the second group. If the number of times that the table index 12 has been generated is greater than a critical value 2, the table index 12 may be swapped with a table index having a code number right higher than the code number of the table index 12 in the index mapping table. If the number of times that a specific table index has been generated satisfies the critical value, a local cumulative counter may be reset. If the critical value is set to 1, the index mapping table may be updated when a symbol value is changed. That is, whenever a symbol (value) is generated, the index mapping table is updated.

The decoder may receive a code number and increase the number of times that a table index corresponding to the code number has been generated. The swapping process of an inverse index mapping table may be generated like in the encoder.

Figure 17:
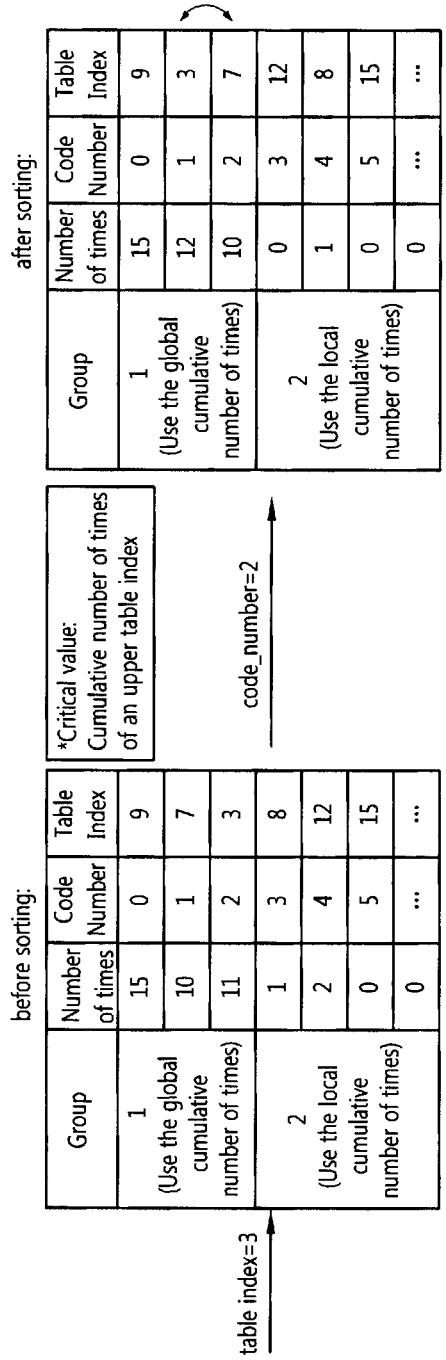
FIG. 17 is a conceptual diagram showing a method of updating an index mapping table according to an embodiment of the present invention.

FIG. 17 is a conceptual diagram showing a method of updating an index mapping table according to an embodiment of the present invention.

Referring to FIG. 17, if a table index corresponding to a first group that counts the global cumulative number of times is generated, the index mapping table may be updated.

For example, if a table index 3 is generated and the table index belongs to a first group, the global cumulative number of times that the table index 3 is generated may be increased by 1. The index mapping table may be updated because it is greater than the cumulative number of times 10 that an upper table index is generated. The cumulative number of times is not reset because a group using a global cumulative variable uses a global cumulative counter. In case of a first group, 10 may be set as a critical value because the global cumulative number of times that a table index 7 having a code number 1 that is 1 smaller than a code number 2 has been generated is 10. If the number of times that a table index has been generated is 10 or higher, the index mapping table may be updated.

An example in which an index mapping table is updated by applying a different critical value to each group is described below. It is assumed that the critical value of a group 1 in FIG. 17 is the global cumulative number of times for a table having a code number that is 1 smaller than a current code number and the critical value of a group 2 is 1. If a table index belonging to the group 1 is generated, whether to update the index mapping table may be determined by comparing the cumulative number of times that a code number corresponding to the table index has been generated with the cumulative number of times that a code number right higher than the code number corresponding to the table index has been generated. If a table index belonging to the group 2 is generated, the index mapping table is updated unconditionally. Furthermore, in case of the group 1, the global cumulative number of times that a table index having a code number that is 1 smaller than a current code number may be set as a critical value as described above, and the mapping index table may be updated by using all the methods using the global cumulative number of times.

The decoder may receive a code number and increase the number of times that a table index corresponding to the code number has been generated. The swapping process of an inverse index mapping table may be generated like in the encoder.

Figure 18:
FIG. 18 is a conceptual diagram showing a method of updating an index mapping table according to an embodiment of the present invention.

FIG. 18 is a conceptual diagram showing a method of updating an index mapping table according to an embodiment of the present invention.

Referring to FIG. 18, in order to normalize the cumulative number of times, the cumulative number of times that each symbol has been generated may be made into ½ when the cumulative number of times is 200 or higher.

In accordance with an embodiment of the present invention, a continuous increase in the cumulative number of times may be prevented by normalizing the cumulative number of times. For example, a variety of methods, such as a method of dividing the cumulative number of times that each symbol has been generated by a maximum value/a minimum value of the cumulative number of times, a method of dividing the cumulative number of times that each symbol has been generated by ½ or a specific value when the cumulative number of times is the specific value or higher, and a method of calculating the cumulative number of times that each symbol has been generated by applying a different weight to the cumulative number of times.

The decoder may receive a code number and increase the number of times that a table index corresponding to the code number has been generated. The swapping process of an inverse index mapping table may be generated like in the encoder.

FIG. 19 is a conceptual diagram showing a method of updating an index mapping table according to an embodiment of the present invention.

Referring to FIG. 19, unlike FIG. 18, when the cumulative number of times is calculated, the cumulative number of times that a table index has been generated may be normalized by applying a different weight to the cumulative number of times that the table index has been generated. For example, the cumulative number of times that each of symbols placed on the upper part of the index mapping table has been generated may be normalized by applying a greater weight to the cumulative number of times that each of the symbols has been generated because the symbols have a higher occurrence probability. Accordingly, the cumulative number of times that each of the symbols has been generated may be normalized on the basis of the cumulative number of times in which a tendency that the existing table index is generated is incorporated by reducing a decrement of the cumulative number of times that each of upper symbols has been generated. As another method, the cumulative number of times may be normalized by using a method of classifying the cumulative number of times into some sections and applying a different weight to each section.

As a method of normalizing the cumulative number of times by applying a different weight, a method of setting a weight table, multiplying the number of times that a symbol has been generated by the weight table, an producing a normalized value by multiplying a weight of the number of times that a symbol has been generated. The decoder may perform the same normalization process as described above.

Figure 20:
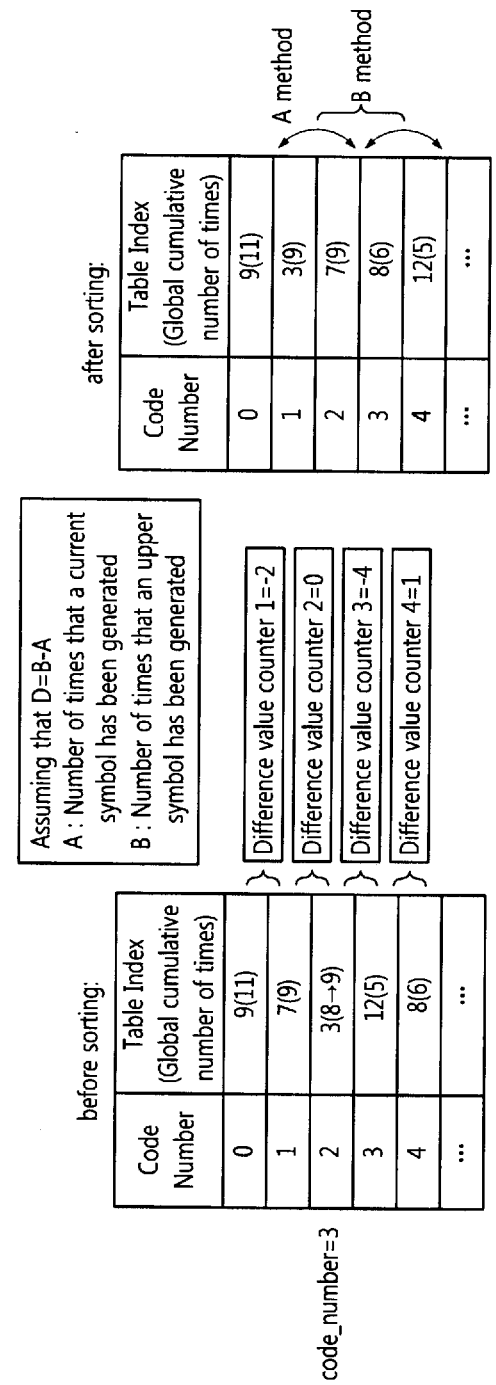
FIG. 20 is a conceptual diagram showing a method of updating an index mapping table according to an embodiment of the present invention.

FIG. 20 is a conceptual diagram showing a method of updating an index mapping table according to an embodiment of the present invention.

Referring to FIG. 20, the index mapping table may be updated on the basis of a difference value of the global cumulative number of times. For example, if a difference value between the global cumulative numbers of times that table indices mapped in order of smaller code number have been generated is calculated, a difference value between the cumulative numbers of times that table indices mapped to respective code numbers have been generated may be calculated like a difference value between a code number 1 and a code number 0 is −2, a difference value between a code number 2 and the code number 1 is 0, a difference value between a code number 3 and the code number 2 is −4, and a difference value between a code number 4 and the code number 3 is 1. If a difference value between the cumulative numbers of times that table indices have been generated is greater than 0, when the cumulative number of times that a table index has been generated is greater in a lower code number than in an upper code number, the index mapping table may be realigned. If a difference value between the cumulative numbers of times is set to a critical value not 0 and is greater than the set critical value, the index mapping table may be realigned.

When the index mapping table is aligned, a method (A) of swapping a table index with a table index, having the smaller cumulative number of times than the cumulative number of times that the table index has been generated and mapped to a smaller code number, by calculating only the cumulative number of times and a method (B) of updating an index mapping table on the basis of the cumulative number of times that a table index not additionally generated has been generated may be used.

If a method of counting a difference value between the counted global cumulative numbers of times is used, the total number of counters used for counting and a computational load of the counters can be reduced and an increase of the memory capacity can be prevented. When a difference value counter for calculating a difference value between values counted by setting a different critical value to each symbol is a specific value or higher, the index mapping table may be aligned.

The decoder may receive a code number and increase the number of times that a table index corresponding to the code number has been generated. The swapping process of an inverse index mapping table may be generated like in the encoder.

FIG. 21 is a conceptual diagram showing a method of updating an index mapping table according to an embodiment of the present invention.

FIG. 21 shows a method of grouping symbols having similar characters and enabling the groups to share one counter when the cumulative number of times is calculated by grouping the symbols.

Table 1 below shows a prediction mode and a part method corresponding to the prediction mode.

TABLE 1

| Counter | PredMode_PartMode | PredMode | PartMode |
|---|---|---|---|
| #1 | 0 | MODE_SKIP | PART_2N×2N |
| #2 | 1 | MODE_INTER | PART_2N×2N |
|  | 2 | MODE_INTER | PART_2N×2N |
|  | 3 | MODE_INTER | PART_2N×N |
|  | 4 | MODE_INTER | PART_N×2N |
|  | 5 | MODE_INTER | PART_N×N |
| #3 | 6 | MODE_INTRA | PART_2N×2N |
|  | 7 | MODE_INTRA | PART_N×N |

Referring to Table 1, the prediction mode and a part mode according to the prediction mode may be grouped into three groups according to the prediction mode. In an embodiment of the present invention, when the cumulative number of times is calculated, grouping may be performed on the basis of the characteristic of a symbol. When a table index corresponding to each group is generated, the global and local cumulative numbers of times that the table index corresponding to the group has been generated may be increased.

Referring to FIG. 21, for example, if a table index 7 is generated, the cumulative number of times for a group including the table index 7 may be increased. After the cumulative number of times for the group including the table index 7 is increased, if the increased cumulative number of times is identical with or greater than the cumulative number of times for a group having a higher code number as a result of comparison, a codeword value mapped to a grouped table index may be increased. That is, a code number mapped to a table index included in a group may be changed on the basis of the cumulative number of times for the group.

The decoder may receive a code number and increase the number of times that a table index corresponding to the code number has been generated. The swapping process of an inverse index mapping table may be generated like in the encoder.

Figure 22:
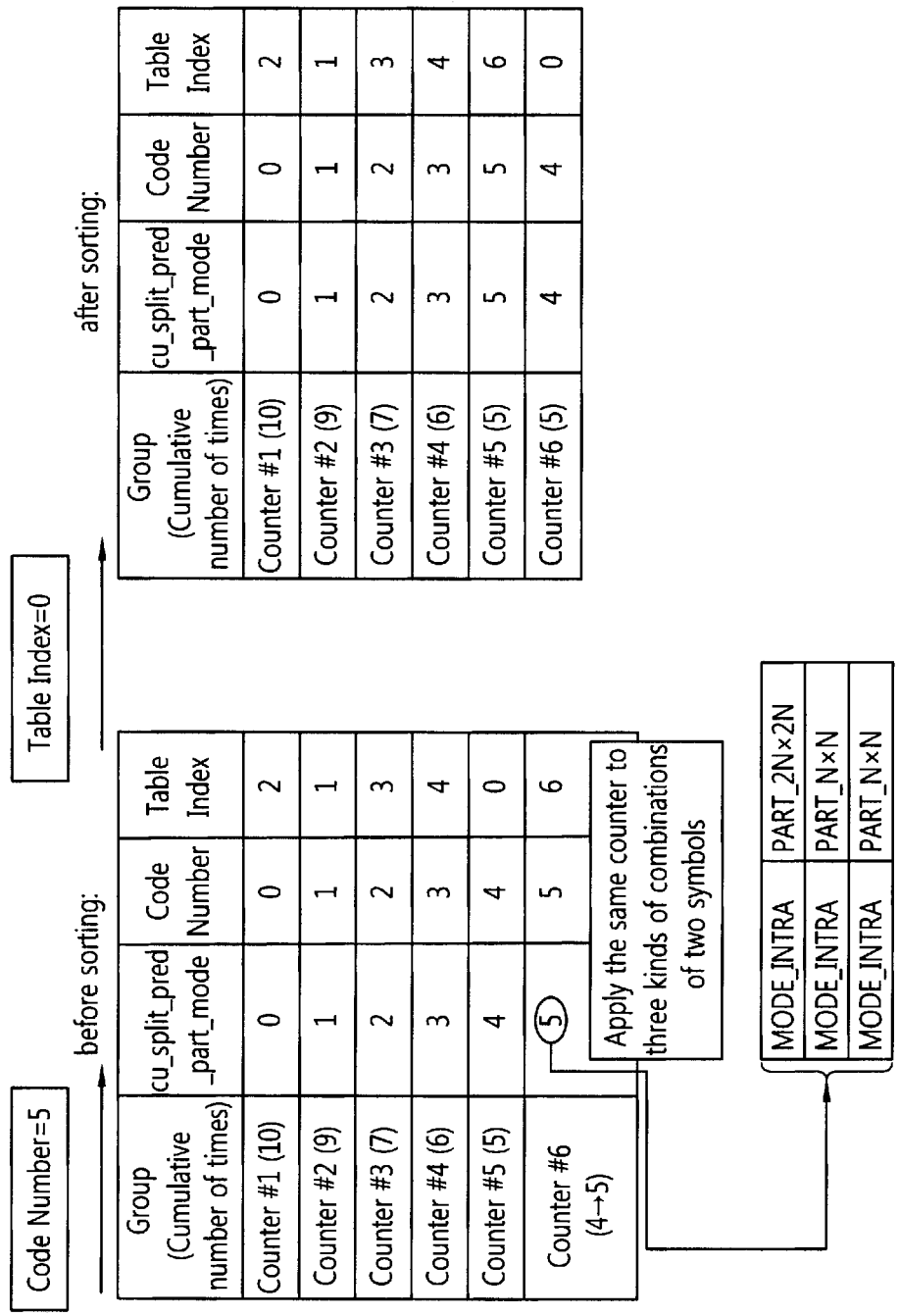
FIG. 22 is a conceptual diagram showing a method of updating an index mapping table according to an embodiment of the present invention.

FIG. 22 is a conceptual diagram showing a method of updating an index mapping table according to an embodiment of the present invention.

Referring to FIG. 22, counting may be performed by applying a different weight to each merged and coded symbol.

For example, a symbol cu_split_pred_part_mode obtained by merging and coding split_coding_unit_flag, merge_flag, PredMode, and PartMode may be indexed as in Table 2 below.

TABLE 2

| cu_split_pred_part_mode | split_coding_unit_flag | merge_flag | PredMode | PartMode |
|---|---|---|---|---|
| 0 | 0 | — | MODE_SKIP | PART_2N×2N |
| 1 | 0 | 1 | MODE_INTER | PART_2N×2N |
| 2 | 0 | 0 | MODE_INTER | PART_2N×2N |
| 3 | 0 | — | MODE_INTER | PART_2N×N |
| 4 | 0 | — | MODE_INTER | PART_N×2N |
| 5 | 0 | — | MODE_INTRA | PART_2N×2N |
| 6 | 0 | — | MODE_INTRA | PART_N×N |
| 7 | 0 | — | MODE_INTER | PARN_×N |

The symbol cu_split_pred_part_mode indexed in Table 2 may be indexed by using counters, such as those shown in Table 3 below.

TABLE 3

| Counter | cu_split_pred_part_mode | split_coding_unit_flag | merge_flag | PredMode | PartMode |
|---|---|---|---|---|---|
| Counter#1 | 0 | 0 | — | MODE_SKIP | PART_2N×2N |
| Counter#2 | 1 | 0 | 1 | MODE_INTER | PART_2N×2N |
| Counter#3 | 2 | 0 | 0 | MODE_INTER | PART_2N×2N |
| Counter#4 | 3 | 0 | — | MODE_INTER | PART_2N×N |
| Counter#5 | 4 | 0 | — | MODE_INTER | PART_N×2N |
| Counter#6 | 5 | 0 | — | MODE_INTRA | PART_2N×2N |
|  |  |  |  | MODE_INTRA | PART_N×N |
|  |  |  |  | MODE_INTER | PARN_N×N |

Referring to Table 3, in accordance with an embodiment of the present invention, in the indexed symbol cu_split_pred_part_mode, symbol values from 0 to 4 may be counted by using respective counters, and symbol values from 5 to 7 may be indexed by using one counter. That is, Counter#6 may perform counting when three kinds of combinations (the symbol values 5, 6, and 7) of PredMode and PartMode are generated.

Referring back to FIG. 22, the number of times that each of two symbols has been generated may be counted by using the same counter for three kinds of combinations for the two symbols. That is, when a counter for counting the number of times that a specific symbol has been generated is used, the index values of the specific symbol may be counted by grouping the index values.

That is, the number of times that a symbol has been generated may be counted by applying one counter to each symbol index, but to a plurality of symbol indices.

Pieces of information that are used for the decoder to update an inverse index mapping table are basically identical with pieces of information that are used for the encoder to update an index mapping table, and a method of the decoder updating the inverse index mapping table is identical with a method of the encoder updating the index mapping table. In the coding method of the encoder, an input is a table index, and a code number mapped to the table index is updated. In the inverse index mapping table of the decoder, however, a code number is an input value, and code numbers or table indices mapped to the code numbers are swapped with each other, so that the inverse index mapping table is updated. In the following embodiment of the present invention, a method of updating an inverse index mapping table by swapping table indices with each other is disclosed, but the inverse index mapping table may be updated by swapping code numbers with each other. The embodiment also falls within the scope of the present invention. In the following embodiment of the present invention, the process of updating the inverse index mapping table (i.e., the decoding process of part of the contents disclosed in FIGS. 4 to 22) is disclosed, but the decoding method may be performed like the method of updating an index mapping table that has been disclosed in FIGS. 4 to 22 in a reverse direction. The embodiment also falls within the scope of the present invention.

Figure 23:
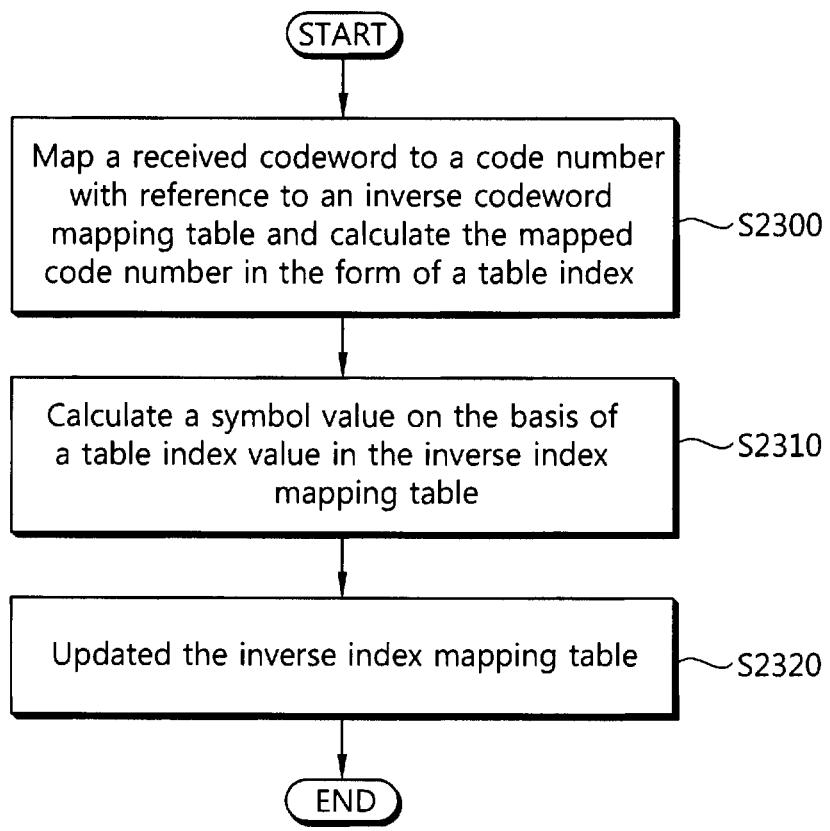
FIG. 23 is a flowchart illustrating a decoding method according to an embodiment of the present invention.

FIG. 23 is a flowchart illustrating a decoding method according to an embodiment of the present invention.

A received codeword is mapped to a code number with reference to an inverse codeword mapping table, and the mapped code number is calculated in the form of a table index (step S2300).

A codeword generated through a coding step may be received, and the received codeword may be mapped to a code number. That is, the received codeword may be mapped to the code number by performing a decoding step according to a process opposite to the coding step. The calculated code number may be restored back to a symbol value with reference to an inverse index mapping table (step S2310).

The inverse index mapping table is updated (step S2320).

More particularly, like in the coding method, a method of mapping a received codeword to a code number with reference to an inverse codeword mapping table, calculating the mapped code number in the form of a table index, and updating an inverse index mapping table on the basis of at least one of the cumulative number of times that a code number has been generated, the consecutive number of times that the code number has been generated, coding/decoding information about a peripheral block, and critical value information for updating the inverse index mapping table may be used in the decoding method.

As described above, the inverse index mapping table may be updated by using the same method as the method of updating the index mapping table in the coding process. In the following embodiment of the present invention, only a process of updating some of the inverse index mapping table is disclosed. However, all the processes of updating an index mapping table, disclosed in the coding process, may be used and the processes fall within the scope of the present invention.

Figure 24:
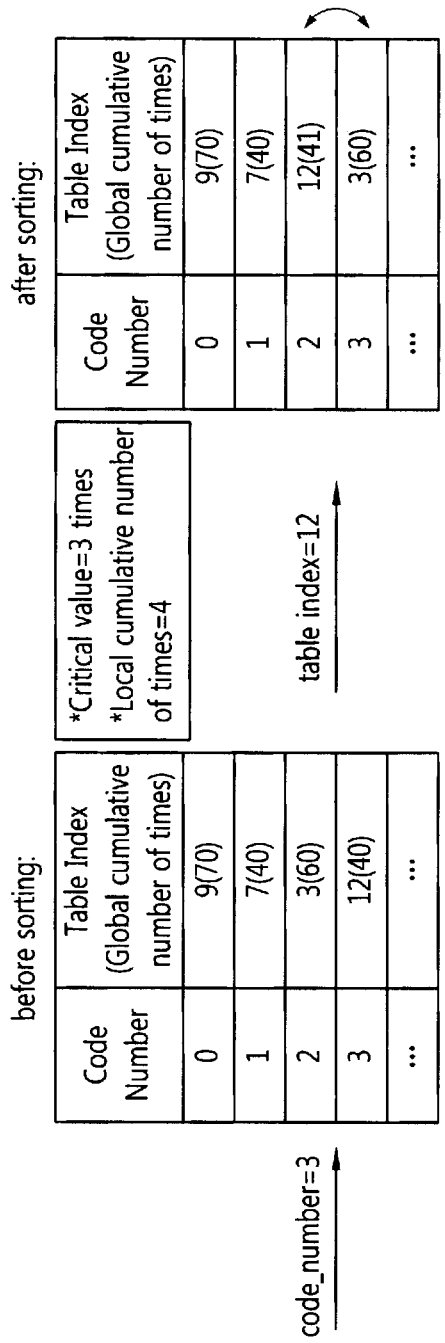
FIG. 24 is a conceptual diagram showing a method of updating an inverse index mapping table according to an embodiment of the present invention.

FIG. 24 is a conceptual diagram showing a method of updating an inverse index mapping table according to an embodiment of the present invention.

Referring to FIG. 24, for example, if a critical value of the local cumulative number of times is set to 3 times and the local cumulative number of times exceeds 3, the inverse index mapping table may be updated by swapping a table index, mapped to a code number, with a table index mapped to an upper code number. If a received code number is 3, the cumulative number of times that a table index corresponding to the received code number has been generated may be increased by 1. If a cumulative critical value exceeds 3 times, a table index mapped to a code number 3 may be swapped with a table index mapped to a code number 2 (i.e., a code number that is 1 smaller than the code number 3.

Figure 25:
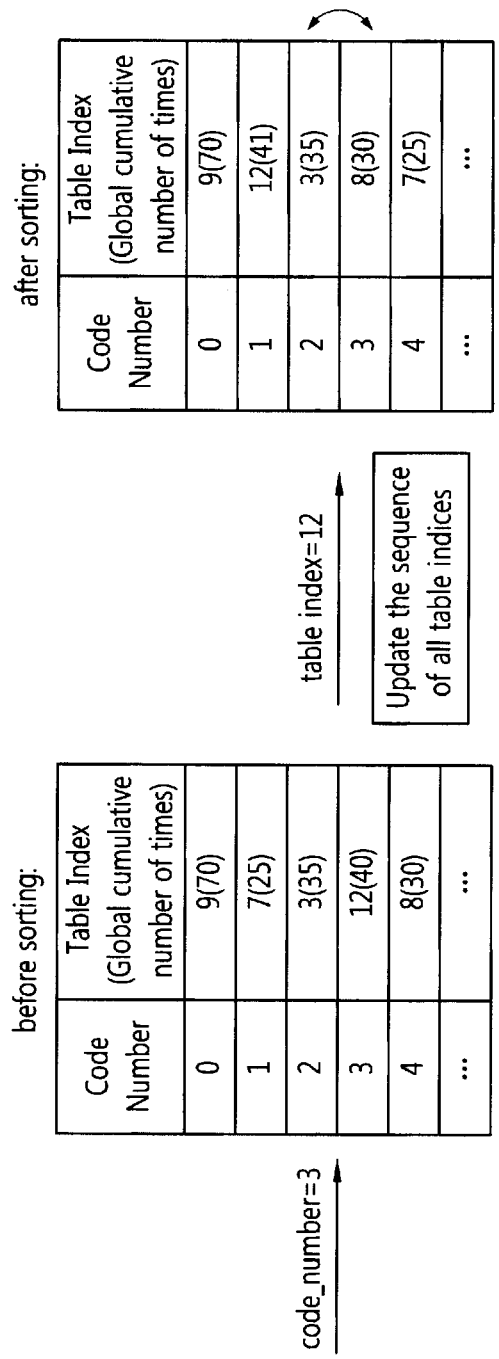
FIG. 25 is a conceptual diagram showing a method of updating an inverse index mapping table according to an embodiment of the present invention.

FIG. 25 is a conceptual diagram showing a method of updating an inverse index mapping table according to an embodiment of the present invention.

Referring to FIG. 25, the inverse index mapping table may be updated on the basis of the global cumulative number of times. The global cumulative number of times that a table index corresponding to a received code number has been generated may be increased by 1. The index mapping table may be updated so that a smaller code number is mapped to a part having the greater global cumulative number of times on the basis of the increased global cumulative number of times that a table index has been generated.

Figure 26:
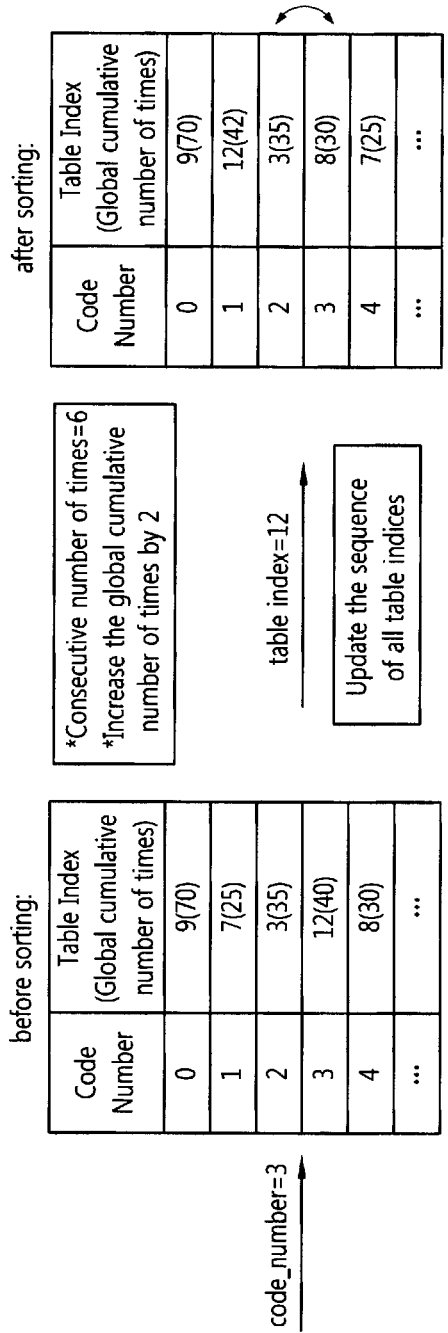
FIG. 26 is a conceptual diagram showing a method of updating an inverse index mapping table according to an embodiment of the present invention.

FIG. 26 is a conceptual diagram showing a method of updating an inverse index mapping table according to an embodiment of the present invention.

Referring to FIG. 26, if a critical value of the consecutive number of times that a table index has been generated is set and is greater than a critical value of the consecutive number of times that a specific code number has been generated, the global cumulative number of times that a table index corresponding to the specific code number has been generated may be increased to a value more than 1. For example, if a critical value of the consecutive number of times is set to 6 and the consecutive number of times that a specific code number has been generated is 6 or more, the global cumulative number of times that a table index corresponding to the specific code number is generated may be increased by 2 not 1. If a specific code number is generated a lot by increasing the global cumulative number of times as described above, the index mapping table may be updated by taking this tendency into consideration.

Figure 27:
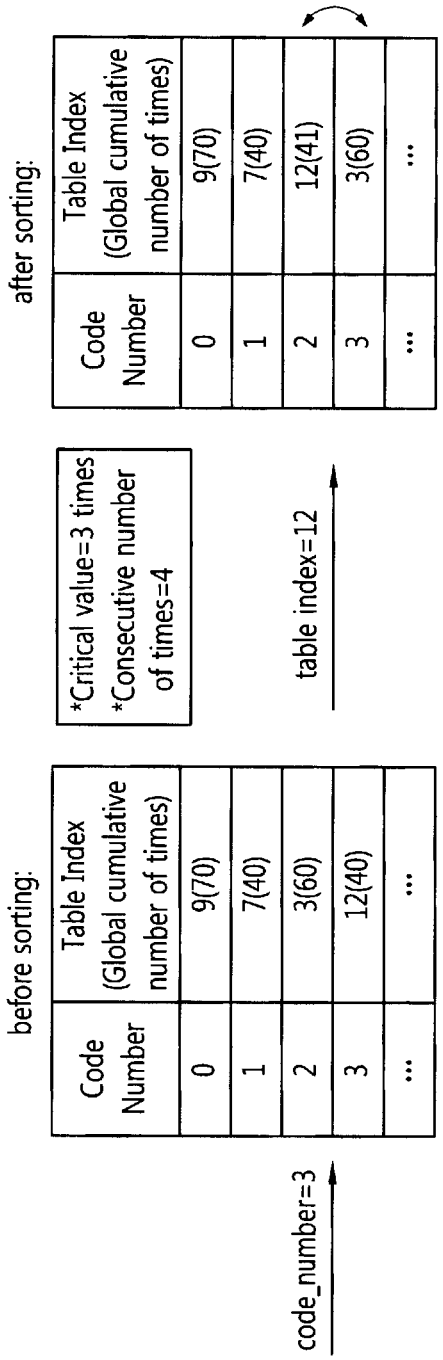
FIG. 27 is a conceptual diagram showing a method of updating an inverse index mapping table according to an embodiment of the present invention.

FIG. 27 is a conceptual diagram showing a method of updating an inverse index mapping table according to an embodiment of the present invention.

Referring to FIG. 27, the inverse index mapping table may be updated by using the consecutive number of times that a code number is generated as a critical value. For example, if the consecutive number of times that a code number has been generated for updating the inverse index mapping table has a critical value 3, the inverse index mapping table may be updated if the consecutive number of times that a specific code number is generated 4 times.

In accordance with an embodiment of the present invention, like the encoder, the decoder may adjust a critical value on the basis of the consecutive number of times that a specific code number has been generated, the cumulative number of times that the specific code number has been generated, and decoding information about peripheral blocks.

Figure 28:
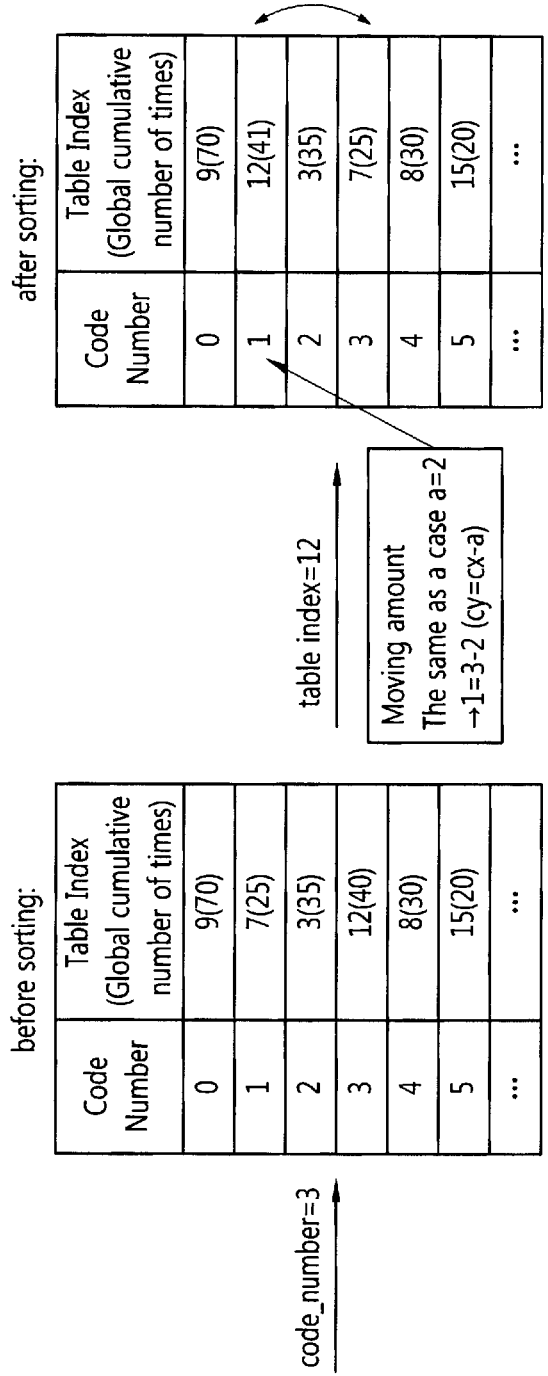
FIG. 28 is a conceptual diagram showing a method of updating an inverse index mapping table according to an embodiment of the present invention.

FIG. 28 is a conceptual diagram showing a method of updating an inverse index mapping table according to an embodiment of the present invention.

Referring to FIG. 28, the inverse index mapping table may be updated according to the cumulative number of times that a symbol value or a table index has been generated. For example, if a code number is 3, the cumulative number of times that a table index corresponding to the code number 3 has been generated may be increased. A specific table index may be swapped with a table index having the smallest code number, from among other table indices having smaller code numbers than the specific table index and having the smaller cumulative number of times than the specific table index, on the basis of the increased cumulative number of times. A current table index may be swapped with a table index having a code number, placed on a plural-level upper part not a one-level upper part, on the basis of the global cumulative number of times.

Figure 29:
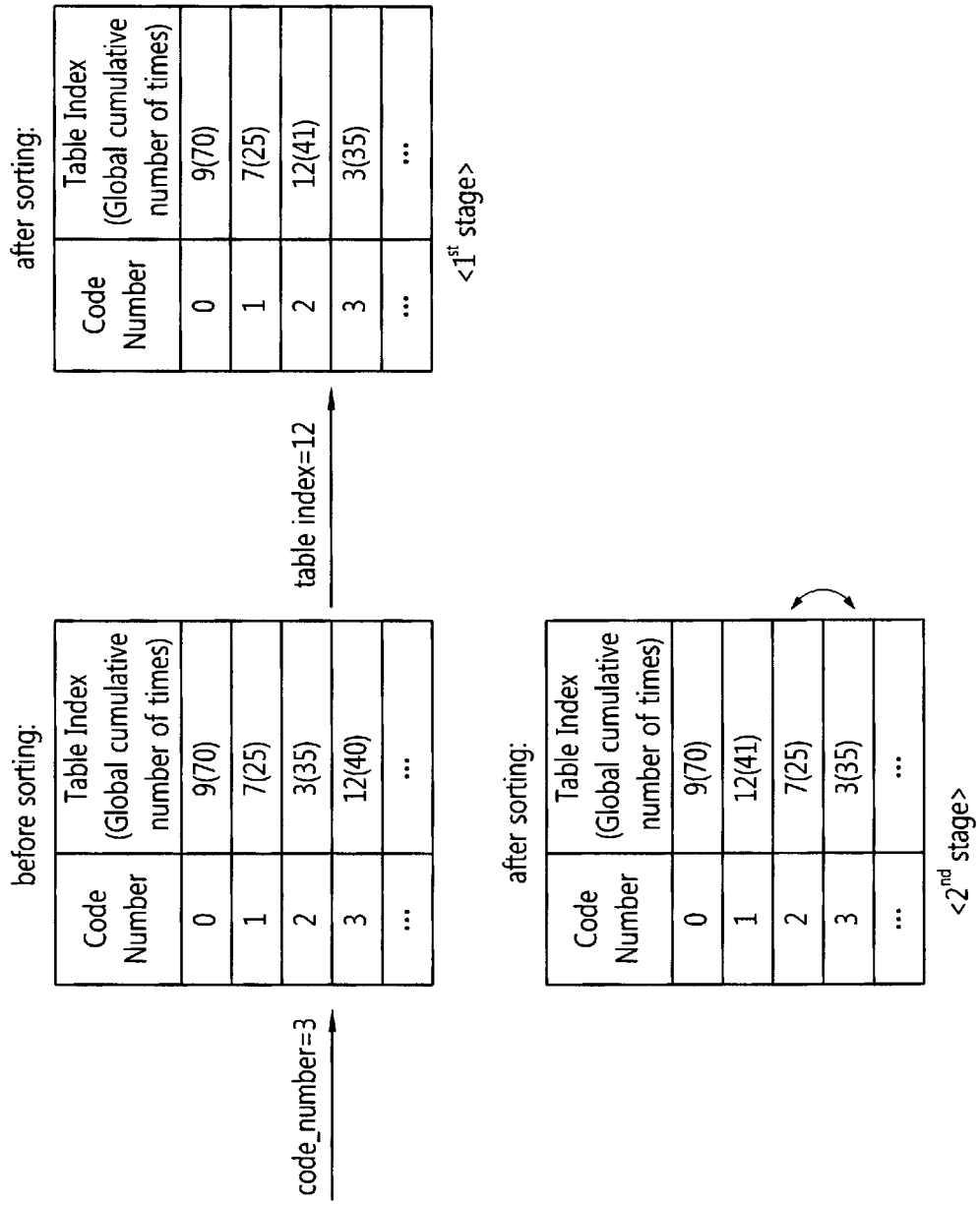
FIG. 29 is a conceptual diagram showing a method of updating an inverse index mapping table according to an embodiment of the present invention.

FIG. 29 is a conceptual diagram showing a method of updating an inverse index mapping table according to an embodiment of the present invention.

Referring to FIG. 29, unlike FIG. 28, the inverse index mapping table may be updated by using a plurality of steps.

For example, if a code number 3 is generated, the global cumulative number of times that a table index 12 corresponding to the code number 3 is generated may be increased. The inverse index mapping table may be updated by comparing the increased global cumulative number of times with the global cumulative number of times that a table index having a code number that is 1 smaller than the current code number 3 has been generated.

If the inverse index mapping table is updated through a previous step, a table index having a code number that is 1 smaller than an updated code number is compared with an increased table index on the basis of the updated code number and the updated table index. If, as a result of the comparison, the global cumulative number of times that the increased table index has been generated is greater than the cumulative number of times that the table index has been generated, a table index having a one smaller code number may be swapped with the increased table index having the increased cumulative number of times. That is, the index mapping table may be updated by performing a plurality of comparison steps.

Figure 30:
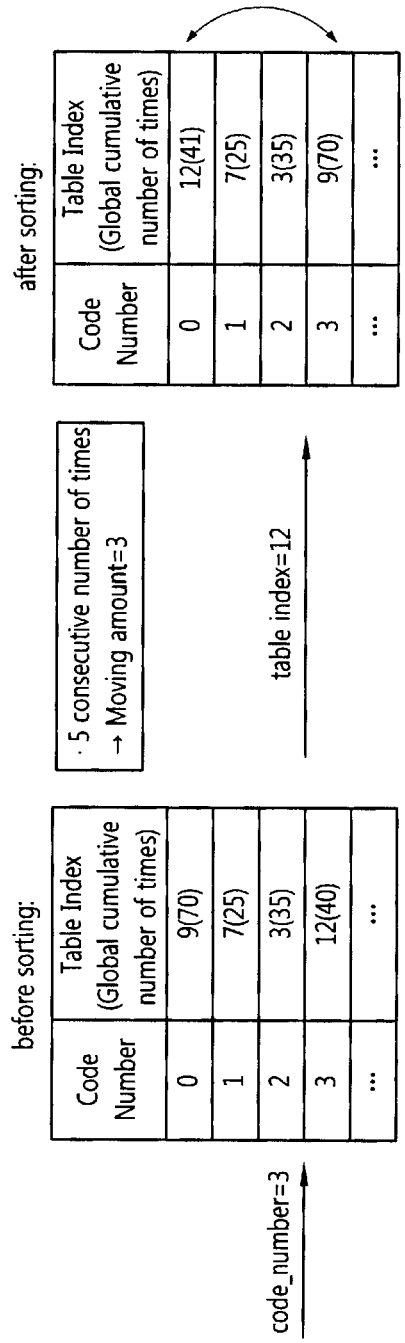
FIG. 30 is a conceptual diagram showing a method of updating an inverse index mapping table according to an embodiment of the present invention.

FIG. 30 is a conceptual diagram showing a method of updating an inverse index mapping table according to an embodiment of the present invention.

Referring to FIG. 30, if a specific code number is consecutively generated, the inverse index mapping table may be updated by swapping a table index, mapped to the consecutively generated code number, with a table index mapped to a plural-level higher code number on the basis of the consecutive number of times that the specific code number has been generated.

For example, if the consecutive number of times that a code number has been generated is 5, an amount that a table index is updated on the inverse index mapping table is set to 3. If a code number is consecutively generated, a table index having a code number placed in plural higher levels may be swapped with a table index having a current code number.

Figure 31:
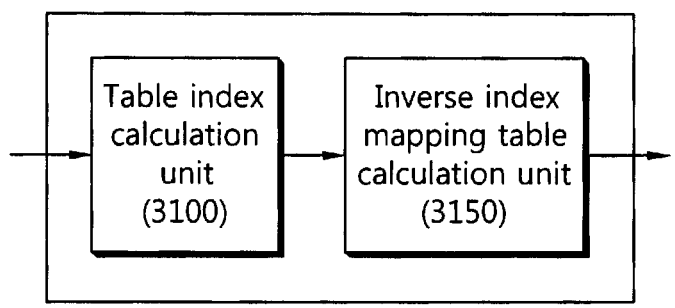
FIG. 31 is a conceptual diagram showing part of an image decoding apparatus according to an embodiment of the present invention.

FIG. 31 is a conceptual diagram showing part of an image decoding apparatus according to an embodiment of the present invention.

Referring to FIG. 31, the image decoding apparatus may include a table index calculation unit 3100 and an inverse index mapping table calculation unit 3150.

The table index calculation unit 3100 may map a received codeword to a code number with reference to an inverse codeword mapping table and calculate the mapped code number in the form of a table index.

The inverse index mapping table calculation unit 3150 may update the inverse index mapping table on the basis of at least one of the cumulative number of times that a code number has been generated, the consecutive number of times that the code number has been generated, coding/decoding information about a peripheral block, and critical value information for updating the inverse index mapping table. The inverse index mapping table calculation unit 3150 may perform the inverse index mapping table update process and the normalization process.

The methods disclosed in FIGS. 3 to 30 may be performed by part of the image encoder and part of the image decoder disclosed in FIGS. 1 and 2, and the embodiments of the methods fall within the scope of the present invention.

While the invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

[Industrial Applicability]

The invention claimed is:
1. An image decoding method, comprising:
  mapping a received codeword to a specific code number with reference to an inverse codeword mapping table and calculating the mapped code number in a form of a table index; and updating an inverse index mapping table based on at least one of a cumulative number of times that the specific code number has been generated, a consecutive number of times that the specific code number has been generated, coding/decoding information about a peripheral block, and critical value information for updating the inverse index mapping table, wherein at least one of the mapping and the updating are performed by a hardware apparatus.

2. The image decoding method of claim 1, wherein, if a number of times that the specific code number has been generated is greater than a specific critical value, updating the inverse index mapping table is performed by swapping the specific code number with an upper code number having a code number value smaller than the specific code number.

3. The image decoding method of claim 1, wherein, if code numbers included in the inverse index mapping table are classified into a plurality of code number groups and a number of times that a first code number group including the code numbers has been generated is greater than a specific critical value, updating the inverse index mapping table is performed by swapping a code number included in a second code number group, including code numbers smaller than the code numbers of the first code number group, with a code number of the first code number group.

4. The image decoding method of claim 1, wherein, if the consecutive number of times that the specific code number has been generated is greater than a specific critical value, updating the inverse index mapping table is performed by swapping the specific code number with a code number smaller than the specific code number.

5. The image decoding method of claim 1, wherein updating the inverse index mapping table is performed in a specific cycle based on a global cumulative number of times that the specific code number has been generated.

6. The image decoding method of claim 1, wherein updating the inverse index mapping table is performed by classifying code numbers, included in the inverse index mapping table, into a plurality of code number groups and by updating the inverse index mapping table in a specific cycle based on a global cumulative number of times that each of the code numbers included in each of the code number groups has been generated.

7. The image decoding method of claim 1, wherein, if the consecutive number of times that the specific code number has been generated is greater than a specific critical value, updating the inverse index mapping table is performed based on a global cumulative number of times that the specific code number has been generated which is calculated by applying a specific weight to a number of times that the specific code number has been generated.

8. The image decoding method of claim 1, wherein, if the consecutive number of times that the specific code number has been generated is greater than a specific critical value, updating the inverse index mapping table is performed based on a global cumulative number of times that a code number included in the inverse index mapping table has been generated.

9. The image decoding method of claim 1, wherein the critical value information for updating the inverse index mapping table is adaptively changed based on the consecutive number of times that the specific code number has been generated, the cumulative number of times that the specific code number has been generated, and the decoding information of the peripheral block.

10. The image decoding method of claim 1, wherein, if a global number of times that the specific code number has been generated is compared with a global number of times that an upper code number has been generated and, as a result of the comparison, the global number of times of the upper code number is greater than the global number of times of the specific code number, updating the inverse index mapping table is performed by swapping the specific code number with a code number which is 1 greater than the upper code number.

11. The image decoding method of claim 1, wherein, if a global number of times that the specific code number has been generated is compared with a global number of times that an upper code number which is 1 smaller than the specific code number and, as a result of the comparison, the global number of times of the upper code number is greater than the global number of times of the specific code number, updating the inverse index mapping table is performed by swapping the specific code number with the upper code number.

12. The image decoding method of claim 1, wherein updating the inverse index mapping table is performed by adaptively making different an amount of a code number swapped with the specific code number based on the consecutive number of times that the specific code number has been generated.

13. The image decoding method of claim 1, wherein updating the inverse Index mapping table is performed by classifying code numbers, included in the inverse index mapping table, into a plurality of code number groups, using one of a global cumulative counter or a local cumulative counter for each of the code number groups, and applying a different critical value for updating an index mapping table to each of the code number groups.

14. The image decoding method of claim 1, may further comprising normalizing a cumulative number of times of the inverse index mapping table when the cumulative number of times of the inverse index mapping table is a specific value or higher.

15. The image decoding method of claim 14, wherein normalizing the cumulative number of times of the inverse index mapping table is performed by dividing a cumulative number of times that each symbol has been generated by a maximum value/a minimum value of the cumulative number of times, dividing a cumulative number of times that each symbol has been generated by ½ or a specific value when the cumulative number of times that each symbol has been generated is the specific value or higher, and applying a different weight to the cumulative number of times each symbol has been generated.

16. The image decoding method of claim 1, wherein updating the inverse index mapping table is performed when a difference value between a cumulative number of times that an upper code number has been generated and the cumulative number of times that the specific code number has been generated is greater than a specific critical value or higher based on the difference value.

17. The image decoding method of claim 1, wherein, if a plurality of symbols is merged and coded into a merged symbol, updating the inverse index mapping table is performed by grouping code numbers for indexing the merged symbol according to a character of a symbol, counting a number of times that the symbol has been generated by using one counter in one of the groups, and swapping the code numbers for every group.

18. An image decoding apparatus, comprising:
a table index calculation unit for mapping a received codeword to a code number with reference to an inverse codeword mapping table and calculating the mapped code number in a form of a table index; and
an inverse index mapping table calculation unit for updating an inverse index mapping table based on at least one of a cumulative number of times that the code number has been generated, a consecutive number of times that the code number has been generated, coding/decoding information about a peripheral block, and critical value information for updating the inverse index mapping table.

* * * * *